(12) United States Patent
Colella et al.

(10) Patent No.: US 6,781,968 B1
(45) Date of Patent: Aug. 24, 2004

(54) WIRELESS COMMUNICATION SYSTEM, APPARATUS AND METHOD USING AN ATMOSPHERIC PLATFORM HAVING A WIDEBAND TRUNKLINE

(75) Inventors: Nicholas J. Colella, Pleasanton, CA (US); George G. Chadwick, Menlo Park, CA (US)

(73) Assignee: Marc Arnold, Niwot, CO (US)

( * ) Notice: Subject to any disclaimer, the term of this patent is extended or adjusted under 35 U.S.C. 154(b) by 0 days.

(21) Appl. No.: 09/493,479

(22) Filed: Jan. 28, 2000

Related U.S. Application Data

(63) Continuation-in-part of application No. 09/149,133, filed on Sep. 8, 1998, and a continuation-in-part of application No. 08/966,973, filed on Nov. 10, 1997.
(60) Provisional application No. 60/117,797, filed on Jan. 29, 1999, and provisional application No. 60/057,787, filed on Sep. 8, 1997.

(51) Int. Cl.[7] .............................. H04B 7/204; H04J 3/16; H04J 3/22; H04Q 7/20
(52) U.S. Cl. ...................... 370/316; 370/319; 370/466; 370/342; 455/431; 455/456; 455/121; 342/356; 342/354
(58) Field of Search ................................ 370/310, 316, 370/312, 315, 318, 323, 325, 334, 346, 347, 466, 522; 455/427, 428, 429, 430, 431, 432; 342/356, 352, 357.1

(56) References Cited

U.S. PATENT DOCUMENTS 4,992,783 A  2/1991  Zdunek et al.

(List continued on next page.)

FOREIGN PATENT DOCUMENTS

| EP | 336079 A2 | 10/1989 |
|---|---|---|
| EP | 0 771 087 A2 | 5/1997 |
| WO | WO 97/07609 | 2/1997 |

(List continued on next page.)

OTHER PUBLICATIONS

A. Ayyagari, J. P. Harrang, S. Ray, "Airborne Information and Reconnaissance Network", Milcom 1996 Conference Proceedings, Oct. 21–24, 1996, vol. 1, pp. 230–234, IEEE.

(List continued on next page.)

Primary Examiner—Man Phan
(74) Attorney, Agent, or Firm—J. Michael Johnson; Elizabeth E. Leitereg

(57) ABSTRACT

A system, apparatus and method provide wireless communications to a geographical area. The system includes at least one atmospheric platform serving as a central relay or node using a star network topology for the geographic area. The atmospheric platform carries a payload that comprises communications equipment. The system further includes a plurality of user equipment units located within the geographic area and at least one ground station or gateway for providing an information pathway between the user equipment units. The gateway has network processing and switching equipment for routing the information between the users. A wireless trunkline carries signals between the gateway and the atmospheric platform. The apparatus and method comprise gateway and payload uplink portions and downlink portions. The downlink portions aggregates and de-aggregates user generated information from the platform to the gateway. The uplink portions de-aggregate and aggregate the information and route the information with the network switching equipment to intended user equipment units, from the gateway to the platform. The gateway may also provide information pathways from the platform to user equipment units outside of the geographic area through existing communications infrastructure. The system, apparatus and method utilize a wide, non-contiguous band of spectrum in point-to-point links to carry the combined signal traffic from a multitude of subscribers on the ground to the communications switches at the gateway and vice versa, via the airborne platform. The use of wireless trunklines enables all types of switching, including circuit, cell, packet, or frame, or any combination thereof, to be performed by standard equipment housed in facilities on the ground rather than by specially designed equipment located on the airborne platform.

13 Claims, 9 Drawing Sheets

U.S. PATENT DOCUMENTS

| | | | | |
|---|---|---|---|---|
| 5,530,449 A | * | 6/1996 | Wachs et al. | 342/174 |
| 5,572,216 A | * | 11/1996 | Weinberg et al. | 342/357 |
| 5,589,834 A | * | 12/1996 | Weinberg | 342/354 |
| 5,664,006 A | * | 9/1997 | Monte et al. | 455/405 |
| 5,666,357 A | | 9/1997 | Jangi | |
| 5,758,260 A | * | 5/1998 | Wiedeman | 455/12.1 |
| 5,771,229 A | | 6/1998 | Gavrilovich | |
| 5,790,049 A | | 8/1998 | Harrell | |
| 5,790,070 A | * | 8/1998 | Natarajan et al. | 342/354 |
| 5,890,679 A | * | 4/1999 | Chethik | 244/158 |
| 5,929,806 A | | 7/1999 | Birchler et al. | |
| 5,931,877 A | | 8/1999 | Rassa et al. | |
| 5,949,766 A | | 9/1999 | Ibanez-Meier et al. | |
| 5,974,315 A | * | 10/1999 | Hudson | 455/427 |
| 6,016,124 A | * | 1/2000 | Lo et al. | 342/373 |
| 6,018,659 A | * | 1/2000 | Ayyagari et al. | 455/431 |
| 6,061,562 A | * | 5/2000 | Martin et al. | 455/431 |
| 6,064,882 A | * | 5/2000 | Coyne et al. | 455/428 |
| 6,195,340 B1 | * | 2/2001 | Hatayama | 370/319 |
| 6,324,398 B1 | * | 11/2001 | Lanzerotti et al. | 455/431 |
| 6,507,739 B1 | * | 1/2003 | Gross et al. | 455/431 |

FOREIGN PATENT DOCUMENTS

| | | |
|---|---|---|
| WO | WO 97/15992 | 5/1997 |
| WO | WO 97/45987 | 12/1997 |
| WO | WO 98/35506 | 8/1998 |
| WO | WO 99/23769 | 5/1999 |

OTHER PUBLICATIONS

D. Brown, "Balloon Technology Offers High–Altitude Applications", *Aviation Week & Space Technology*, Nov. 16, 1992, pp. 56–57.

* cited by examiner

WIRELESS COMMUNICATION SYSTEM, APPARATUS AND METHOD USING AN ATMOSPHERIC PLATFORM HAVING A WIDEBAND TRUNKLINE

CROSS-REFERENCE TO RELATED APPLICATIONS

This patent application is a regular application of and claims priority from Provisional Application Serial No. 60/117,797 filed Jan. 29, 1999. Moreover, the present application hereby references (1) Continuation-In-Part application Ser. No. 09/149,133, filed Sep. 8, 1998 of (and 2) prior patent application Ser. No. 08/966,973 filed Nov. 10, 1997, which is based on and claims priority from Provisional Application Serial No. 60/057,787 filed Sep. 8, 1997, which are incorporated herein by reference.

FIELD OF THE INVENTION

This invention is directed to the field of wireless communications and in particular to network system for providing regional wireless communications.

BACKGROUND OF THE INVENTION

The worldwide demand for increased connectivity, especially via wireless networks has increased dramatically in the last decade. Individual subscribers to a network have come to expect high quality, seamless, connectivity within the network and between the network and other networks. Additionally, connectivity demands by network subscribers, once confined almost exclusively to narrowband data such as voice services, now include voice, data, text, sound and video typically considered wideband data. Therefore, concomitant with the increased demand for connectivity has been an increase in demand for bandwidth both in terms of bandwidth allocated to the individual subscriber terminal within the network and in terms of the overall network bandwidth. The bandwidth demands are increasing dramatically in part due to the surge in Internet related services that are being provided via these networks.

To address the need for more bandwidth and better connectivity, a number of new technologies and systems, both hardware and software, are being developed, with steadily improving performance, to deliver voice, data, text, sound, and video at higher speeds and decreasing prices.

While much of the network connectivity has traditionally been supplied by so called wired networks, wireless networks are becoming a more and more important part of the overall approach to connectivity. Wireless systems for the delivery of network services include those based on transmission from and to terrestrial towers, transmission from and to satellites in orbit around the earth and, very recently, transmission to and from atmospheric platforms. Examples of terrestrial tower based wireless systems included cellular telephone systems and point-to-point microwave local loops. Satellite systems include low-earth orbit (LEO), medium-earth orbit (MEO), and geostationary earth orbit (GEO), systems. Transmission to and from an atmospheric platform for providing network connectivity is described in the co-pending applications referenced hereinabove.

As described in the co-pending applications, the atmospheric platform serves as a central node, providing connectivity between the various elements in a wireless communications network. Such an atmospheric platform based network configuration offers distinct benefits and advantages over both terrestrial tower and satellite systems. Some of the advantages are described below. One advantage is that the atmospheric platform provides a simple network topology. For example, the network has one node for all subscribers instead of many nodes as in a mesh topology typical of terrestrial tower based wireless systems. Moreover, the atmospheric platform offers a clear, unobstructed signal path to nearly every rooftop in the signal footprint of the network owing to its relatively high altitude compared to terrestrial towers. Further, the atmospheric platform based network provides for the use of smaller power-aperture products of both the subscriber terminals or user equipment units (UE) and platform antennas for achieving information rates greater than possible with systems such as those involving orbiting satellites. Additionally, the atmospheric platform based network can be routinely serviced, improved, and upgraded by modifying the equipment aboard the atmospheric platform, an action that is not routine with satellites. Services to all subscribers can be improved or enhanced by modifying a single node only, i.e., the atmospheric platform, rather than simultaneously upgrading tens to hundreds of towers of typical terrestrial wireless networks. Also, most components selected for the communications network equipment aboard the platform can be of a commercial grade from vendors in the terrestrial wireless communications markets, rather than of a space grade as required by satellites.

However, there are often severe practical limitations affecting weight, linear dimensions, power, and thermal performance imposed on the network equipment operating aboard the atmospheric platform. While they are limitations for operation on the airborne platform, the weight, linear dimensions, power and thermal performance are seldom bothersome to equipment installations on the ground. To accommodate the use aboard an airborne platform, it is often necessary to "repackage" equipment with attending added cost and technical risk. The task of "repackaging" may include, but is not limited to, reconfiguring circuit modules and boards, redesigning power conditioning circuits and their interfaces, introducing fluid cooling to components normally requiring air flow only, and manufacturing of special-purpose mechanical fixtures and interfaces. Often with components that need to be "repackaged", a close working relationship with the vendor or vendors of the equipment is required in order to be successful. For highly complex equipment, such as state-of-the-industry packet switches, slight modifications can profoundly affect performance. In the highly competitive telecommunications markets, switch manufacturers optimize their products for their established customers to maintain their sales volumes and market share, and will pursue new applications requiring modifications of their core products typically only if stimulated by large funding and/or the prospect of a large future sales opportunity.

Consequently, when possible, it is advantageous to operate the network equipment in conditions as closely as possible to those specified by the vendor for normal operation, in order to preclude the need for repackaging. Operating network equipment under "normal" conditions eliminates risk and reduces cost. Since the most complex equipment in any given network is that associated with network processing and switching, a great advantage can be realized by minimizing the need for repackaging. One way to overcome the need for repackaging in the case of the atmospheric platform based network is to locate the "switch" on the ground rather than in the atmospheric platform. However, this solution is not without its problems. One problem to overcome is how to accomplish this without sacrificing network connectivity or other performance characteristics of the network.

It would be advantageous to have a wideband wireless communications system that combined the benefits of an airborne platform with the benefits of network processing and switching on the ground. Such a system could use standard equipment on the ground rather than specially designed equipment for the airborne platform.

SUMMARY OF THE INVENTION

The present invention is a novel communications network utilizing an airborne or atmospheric platform as a central node in a star topology wireless communication network serving a plurality of subscribers. Moreover the communications network of the present invention incorporates communications equipment aboard the airborne platform providing a bidirectional, aggregated wideband wireless communications channel called a trunkline between the airborne platform and one or more ground stations or gateways so that complex network equipment, for example switches and channelizers, can be located on the ground instead of on the airborne platform.

According to the present invention, a novel network architecture provides wireless communications, such as voice, data, images, video, and multi-media services, to a geographic area large enough to encompass a city and its neighboring communities. The network of the present invention can provide broadband and narrowband data services to subscribers by utilizing signal bandwidths at either microwave or millimeter wave (MMW) carrier frequencies for providing wireless subscriber links. The present invention utilizes a wide, contiguous or non-contiguous band of spectrum in point-to-point links serving as wireless trunklines connecting the network gateways or ground stations, on the ground, to the communications equipment aboard an airborne platform. Each trunkline carries the combined signal traffic from a multitude of subscribers on the ground to the communications switches at the network gateway/ground station, and vice versa, via the airborne platform. The use of wireless trunklines enables all types of switching, including circuit, cell, packet, or frame, or any combination thereof, to be performed by standard equipment housed in facilities on the ground rather than by specially designed equipment located on the airborne platform. The wireless trunklines have bandwidths wide enough to convey the aggregated data traffic from the entire set of active users of the network with an atmospheric platform as its central relay node.

In one aspect of the invention, a system for providing wireless communication services in a geographic area using a star network topology is provided. The system includes at least one atmospheric platform serving as a central relay or node for the geographic area. The atmospheric platform carries a payload that comprises communications equipment. The system further includes a plurality of user equipment units located within the geographic area and at least one ground station or gateway for providing an information pathway between the user equipment units. The gateway has network processing and switching equipment for routing the information between the users. The system still further includes a wireless trunkline for carrying signals between the gateway and the atmospheric platform. The wireless trunkline comprises an uplink portion and a downlink portion. The downlink portion carries aggregated information, which was transmitted from one or more of the user equipment units, from the platform to the gateway. The uplink portion carries the aggregated information, which is routed by the network switching equipment to one or more intended user equipment units, from the gateway to the platform. The gateway may further provide information pathways from the platform to user equipment units outside of the geographic area through existing communications infrastructure, such as public switched telephone network (PSTN), fiber optics, satellites or another atmospheric platforms servicing different geographical areas.

In another aspect of the present invention, an apparatus is provided that aggregates and transmits a plurality of signals and receives and de-aggregates the plurality of signals using a wireless trunkline. The wireless trunkline is between an atmospheric platform and a ground-based gateway. The atmospheric platform has an airborne antenna array subsystem and an airborne trunkline antenna subsystem on board. The gateway includes a gateway antenna subsystem and a gateway network processing subsystem, including a network switch. The apparatus of the invention comprises a downlink apparatus and an uplink apparatus.

The downlink apparatus comprises a payload portion on the atmospheric platform and a gateway portion on the gateway. The payload portion accepts a plurality of downlink signals from the airborne antenna array subsystem. The downlink signals are aggregated to create a downlink trunkline signal. Further the payload portion passes the downlink trunkline signal to the airborne trunkline antenna subsystem for transmission via the wireless trunkline to the gateway. The gateway portion accepts the downlink trunkline signal received from the wireless trunkline by way of the gateway antenna subsystem. The downlink trunkline signal is de-aggregated into the plurality of downlink signals by the gateway and passes the de-aggregated downlink signals to the gateway network processing subsystem for routing and transmission via the uplink apparatus.

The uplink apparatus likewise has a gateway portion on the gateway and a payload portion on the atmospheric platform. The gateway portion of the uplink apparatus accepts a plurality of uplink signals from the gateway network processing subsystem. The uplink gateway portion aggregates the uplink signals to create an uplink trunkline signal and passes the uplink trunkline signal to the gateway antenna subsystem for transmission by way of the wireless trunkline to the atmospheric platform. The payload portion accepts the uplink trunkline signal received from the wireless trunkline with the airborne trunkline antenna subsystem. The uplink trunkline signal is de-aggregated into the plurality of uplink signals. The de-aggregated uplink signals are passed to the airborne antenna array subsystem for transmission to the intended recipients.

The payload portion of the downlink apparatus comprises a plurality of sets of frequency conversion multiplexers, which aggregates and frequency shifts the received signals several times until the downlink trunkline signal is created. The gateway portion of the downlink apparatus comprises a plurality of sets of frequency conversion demultiplexers, which de-aggregates and frequency shifts the downlink trunkline signal several times until the uplink trunkline signal is created.

In still another aspect of the invention, a method of wireless communication is provided. The method uses the system and apparatus described above for receiving and transmitting signals between the user equipment units, the airborne platform and the gateway using a wireless trunkline. In one embodiment, the method also uses existing communications infrastructure to receive and transmit signals outside of the geographical area that the system serves.

The method of the present invention comprises, in the payload portion of the downlink, the step of aggregating a plurality of downlink signals that have been accepted or received from the airborne antenna array subsystem. The airborne antenna array subsystem receives signals from the user equipment units, for example. The downlink signals are aggregated to create a downlink trunkline signal. The method further comprises the step of passing the downlink trunkline signal to the airborne trunkline antenna subsystem for transmission via the wireless trunkline to the gateway.

In the gateway portion of the downlink, the method further comprises the step of de-aggregating the downlink trunkline signal that has been accepted or received from gateway antenna subsystem by way of the wireless trunkline. The downlink trunkline signal is de-aggregated into the plurality of downlink signals by the gateway. The method further comprises the step of passing the de-aggregated downlink signals to the gateway network processing subsystem for routing and transmission via the uplink apparatus.

In the gateway portion of the uplink apparatus, the method of the invention accepts the plurality of uplink signals from the gateway network processing subsystem. The method further comprises the step of aggregating the uplink signals to create an uplink trunkline signal. The uplink trunkline signal is passed to the gateway antenna subsystem for transmission by way of the wireless trunkline to the atmospheric platform.

In the payload portion of the uplink apparatus, the method of the invention further comprises the step of de-aggregating the uplink trunkline signal that has been accepted or received from the wireless trunkline using the airborne trunkline antenna subsystem. The uplink trunkline signal is de-aggregated into the plurality of uplink signals. The de-aggregated uplink signals are passed to the airborne antenna array subsystem for transmission to the intended recipients.

The present invention provides a robust system, apparatus and method that combines the benefits of providing the network switching capability on the ground with the benefits of using an airborne platform instead of costly satellite technology. The network of the present invention is particularly useful in broadband and narrowband communications markets, serving the needs of users requiring fixed, portable, and mobile communications services.

DETAILED DESCRIPTION OF THE PREFERRED EMBODIMENT

The present invention provides a novel communications network utilizing an airborne or atmospheric platform as a central node or relay in a wireless communication network serving a plurality of subscribers or users. Moreover, the communications network of the present invention incorporates communications equipment referred to hereinbelow as a payload, aboard the atmospheric platform. The payload communicates with one or more ground stations or gateways via one or more bidirectional, aggregated wideband wireless communications channels, called trunklines, between the atmospheric platform and the one or more ground stations or gateways. Each trunkline carries the combined signal traffic from a multitude of subscribers (customers) on the ground to the communications switches at the network gateway/ground station, and vice versa, via the airborne platform. The use of trunklines enables the complex switching and processing network equipment, for example switches and channelizers, to be located on the ground instead of on the airborne platform. Furthermore, the networking switching, including circuit, cell, packet, or frame switching, or any combination thereof, can be performed by standard equipment housed in facilities on the ground rather than by specially designed equipment located on the airborne platform.

The present invention provides the following features and advantages not provided by the above referenced co-pending applications. First, the present invention utilizes wireless wideband trunklines to convey the aggregated signal traffic of the network to and from the atmospheric platform and the network gateway(s)/ground station(s). Second, the major switching equipment and operations are relocated from aboard the atmospheric platform to the ground. Third, the bandwidth required by the wireless trunklines is obtained from contiguous or non-contiguous spectral bands in the millimeter wave region of the electromagnetic spectrum. Fourth, the wireless trunklines are composed of spectral bands with frequencies that are high enough to create beams with narrow angular widths and with signal attenuation in air (with and without moisture and precipitation) high enough to prevent interference with nearby users occupying those same spectral bands. Fifth, the trunklines achieve capability through the use of small apertures on the airborne platform and apertures of modest size at the gateway(s)/ground station(s) on the ground.

Figure 1:
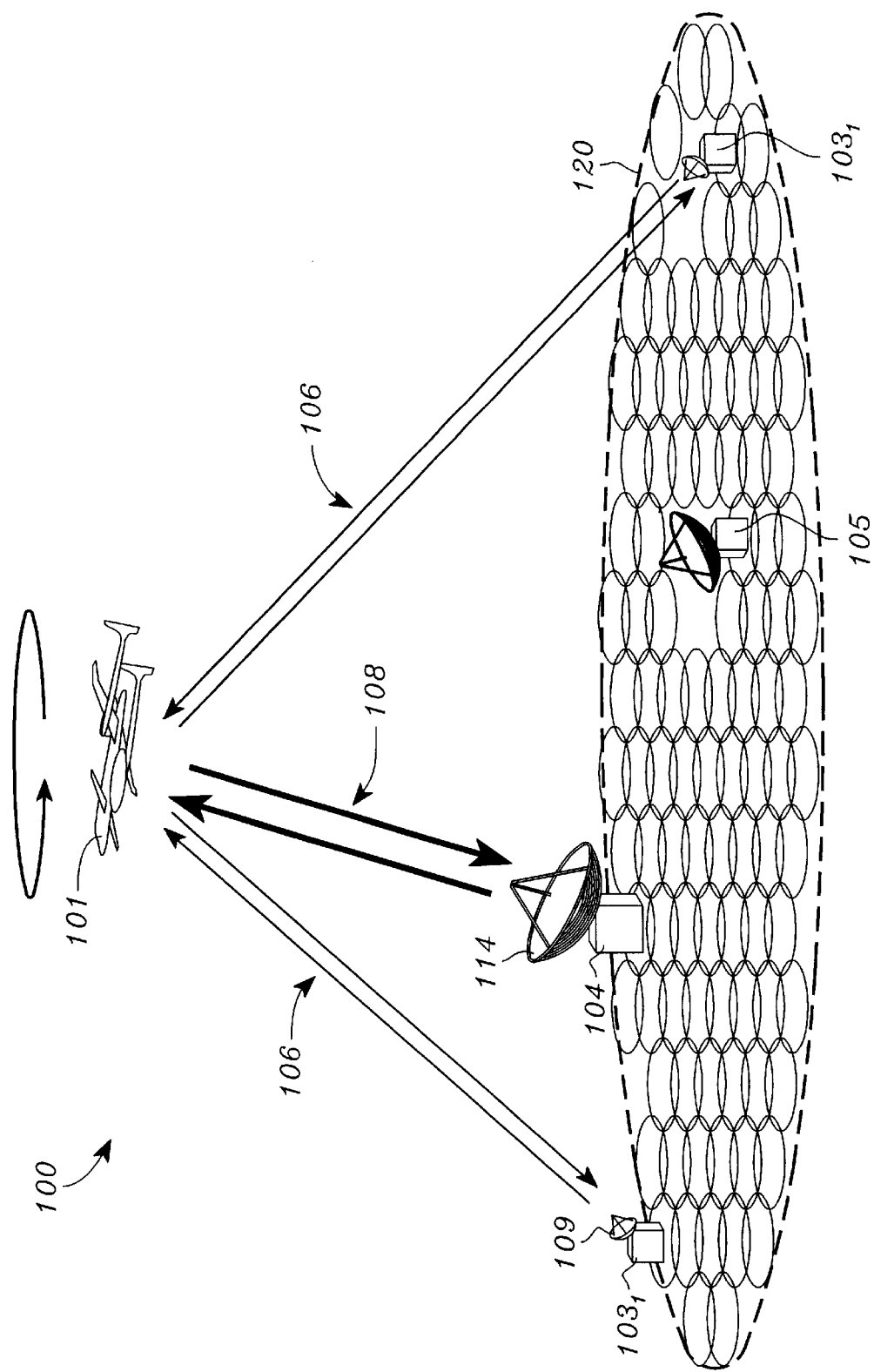
FIG. 1 illustrates the general architecture of the network system according to the present invention.

In one aspect of the present invention, a system provides a wireless communications network between one or more ground-based terminals known as user equipment units. Additionally, the system of the present invention provides connectivity between the user equipment units within the network and users in networks beyond or outside of the network of the present invention. FIG. 1 illustrates the system 100 network architecture of the present invention. The system 100 comprises at least one atmospheric platform 101 having a payload pod. The atmospheric platform 101 serves as a main or central node in a star topology wireless network. A star topology wireless network, as used herein, refers to a wireless network in which a plurality of nodes are bi-directionally connected to a central node using wireless channels or links such that communication between nodes occurs by way of the central node. The system 100 further comprises one or more ground based user equipment units 103, and at least one gateway or ground station 104. Preferably, and as illustrated in FIG. 1, the network 100 comprises a plurality of user equipment units $103_i$, ($i=1 \rightarrow n$) and at least one gateway 104 serving as a primary gateway and at least one backup gateway 105. According to the invention, the atmospheric platform 101 functions as a single-node relay of the wireless communications network of the system 100 providing both narrowband and broadband services to the user equipment units 103 of the system 100.

The ground based user equipment unit 1 03i comprises an antenna 109 and a transceiver unit. Each antenna 109 possesses a tracking system (not shown) for pointing a main signal lobe of the antenna 109 at the moving atmospheric platform 101. Alternatively, in some cases a non-tracking, broad beam antenna can be used. The user equipment units 103 enable individual users to have access to communications services offered by the network of system 100 through the atmospheric platform 101. The user equipment units 103 transmit data to and receive data from the atmospheric platform 101 via bi-directional RF data signals called user links illustrated as arrows 106 in FIGS. 1 and 2. The term "data" when used herein refers to analog or digital information traffic including but not limited to voice, digital data, video, text or audio. Under normal operational conditions, it is assumed that the tracking antennas 109 of the ground-based user equipment units 103 each have an unobstructed view of the atmospheric platform 101. The altitude at which the atmospheric platform 101 is operated normally insures the unobstructed view of the atmospheric platform 101 by the user equipment units 103.

Data from individual user equipment units 103 travels to the atmospheric platform 101 via the uplink portion of the bi-directional user link 106. The uplink portion of an individual user link 106 is received by the atmospheric platform 101 as an user uplink signal. The atmospheric platform 101 aggregates all of the uplinked signals received from the various users and relays the aggregated signal to one or more of the gateways 104 via a trunkline 108 having a downlink portion and an uplink portion. The trunkline 108 is illustrated as arrows in FIG. 1. Similarly, signals intended for individual users are uplinked via the trunkline 108 from one or more of the gateways 104 to the atmospheric platform 101 as an aggregated signal. The atmospheric platform 101 separates the aggregated signals present in the uplink portion of the trunkline 108 and transmits the signals to the appropriate user equipment units 103 by the downlink portion of the individual user links 106.

The array of circles illustrated in FIG. 1 represents a plurality of spot beams produced by an airborne antenna array carried by the atmospheric platform 101 as part of the payload. The airborne antenna array in conjunction with the rest of the payload is used to transmit and receive signals to and from the user equipment units 103 via the user links 106. The array of spot beams taken as a whole is the illumination pattern of the airborne antenna at the surface of the earth and is known as the illumination footprint or simply footprint 120. User equipment units 103 that have an unobstructed view of the atmospheric platform 101 and which are within the footprint 120 of the airborne antenna can communicate via the user link 106 with the atmospheric platform 101. User equipment units 103 that are outside the footprint 120 cannot communicate directly with the atmospheric platform 101.

The gateway 104 determines the destination of signals within the aggregated signal received from the atmospheric platform 101 and switches the signals to the appropriate destination. A destination can be within the network of the system 100 or outside the network of the system 100. When the destination is within the network of the system 100, the signal is switched to an appropriate channel of the network trunkline 108 and aggregated together with other signals to be transmitted to the atmospheric platform 101. When the destination is outside of the network of the system 100 the signal is routed via the gateway 104 to a connection with other networks. An example of such a connection is the public switched telephone network (PSTN). In this manner, individual users within the network have connectivity with destinations both within and beyond the network formed by the system 100. The gateway 104 also has a tracking antenna 114 (antenna 115 on the backup gateway 105) typically larger than the antennas 109 of the user equipment units 103. The tracking antennas 114, 115 of the gateways 104, 105 similarly have an unobstructed view of the atmospheric platform 101, also due to the high altitude of the atmospheric platform 101.

The atmospheric platform 101 operates at an altitude sufficiently high to provide an unobstructed view of the platform 101 from the user equipment units 103 and the gateway 104 including the backup gateways 105. Preferably the atmospheric platform 101 is operated at an altitude above the normal operational altitudes of commercial airlines. In the preferred embodiment, the atmospheric platform 101 is operated at an altitude equal to or greater than 40,000 ft above sea level, more preferably greater than or equal to 50,000 ft.

Typically, a broadband network will be transacting Gigabits per second of data and the resulting bandwidth will be larger than can be managed at microwave frequencies. This difficulty is overcome using the invention by converting the data to millimeter wave (MMW) frequencies where the percentage bandwidth is technically feasible. Therefore, the trunklines 108 of the system 100 of the present invention are wireless bi-directional links with center frequencies in the MMW range. For example, if 10 GHz is the required bandwidth for the data throughput of the system 100, then the downlink portion of th trunkline might be from 70 GHz to 80 GHz and the uplink portion of the trunkline 108 might be from 80 GHz to 90 GHz. The resultant percentage bandwidth of the trunkline 108 downlink would be 13.33%. Similarly the percentage bandwidth of the trunkline 108 uplink would be 11.8%. These percentage bandwidths are easily accommodated technically with MMW transmission components currently available.

Referring again to FIG. 1, two ground-based user equipment units $103_1$ and $103_2$ are shown for simplicity. In practice, there are as many user equipment units $103_n$ as would be necessary to service all of the users (customers) in the network of the system 100. While it is understood that numerous user equipment units $103_n$ will be used and serviced by the atmospheric platform 101, many will be at fixed locations, while others may be portable or mobile. Moreover, it is to be understood that more than one primary gateway 104 and/or more than one backup gateway 105 could be employed in accordance with the invention. In addition, FIG. 1 shows only one trunkline 108 for simplicity, and it is understood that more than one trunkline could be employed in the invention. The number of trunklines generally depends on the number of gateways. Typically one trunkline (downlink/uplink pair) is associated with each gateway.

Figure 2:
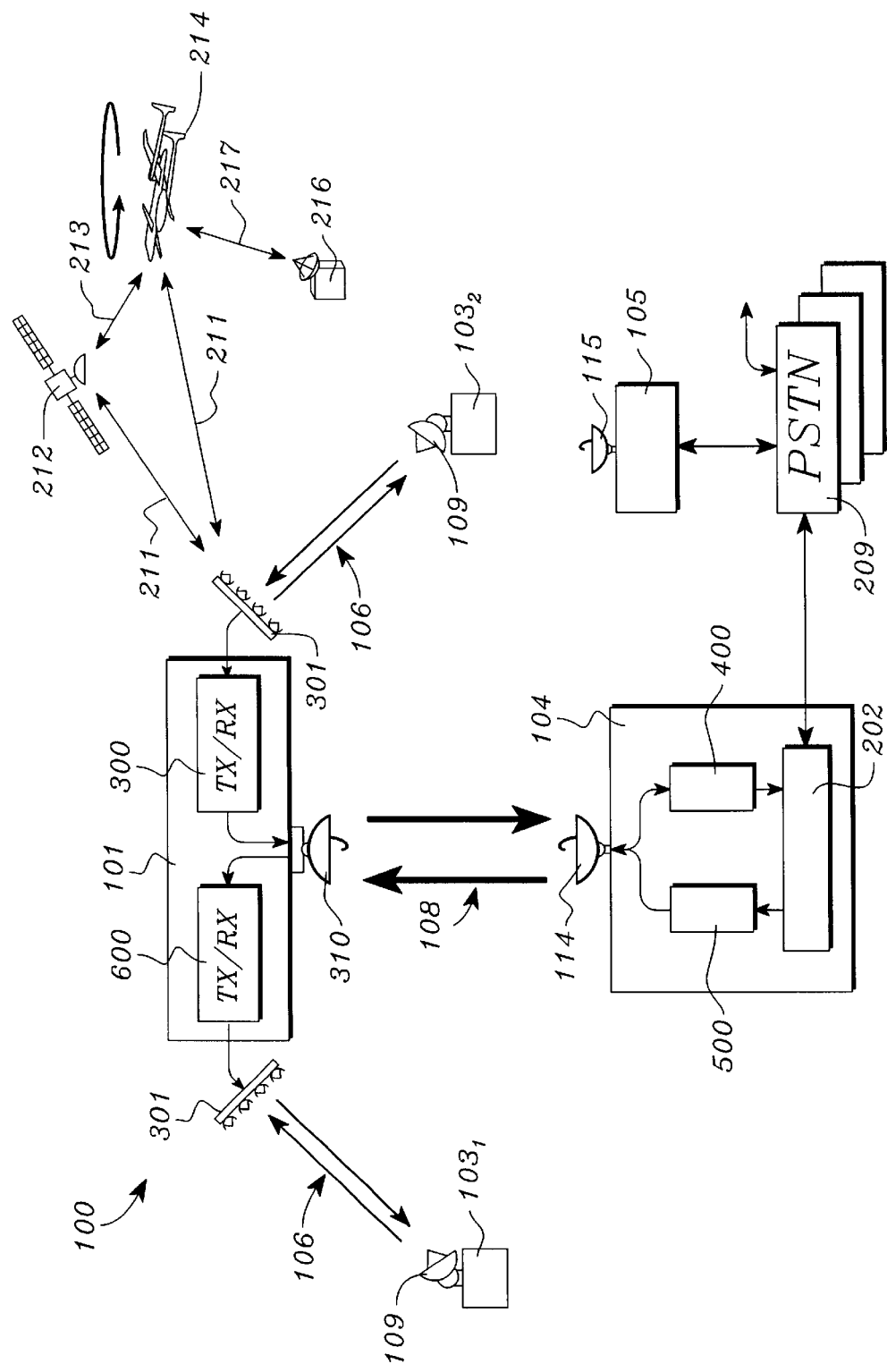
FIG. 2 illustrates the communication pathways or links between users using the network system of the present invention.

A functional diagram of the system 100 of the present invention is illustrated in FIG. 2 with one primary gateway 104, associated trunkline 108, and one backup gateway 105 for simplicity. The payload on the platform 101 aggregates the data traffic from the user equipment units 103 and sends the aggregated data or signals to the gateway 104. Within the gateway 104, 105 switching or signal routing is performed by a source-to-destination switch 202. The gateway 104, 105 sends the switched data to the atmospheric platform 101 via the uplink portion of the trunkline 108 for distribution to the individual users 103 in the network. The specific number of network components in the examples herein is shown only for illustrative purposes and are not intended to limit the scope of the present invention. The payload of the atmospheric platform 101 carries an airborne antenna array subsystem 310. In the preferred embodiment the airborne antenna array subsystem comprises a plurality or antennas, some of which generate a frequency reuse pattern within the geographical area or footprint being serviced by the atmospheric platform 101, as is well-known in the art.

Users within the same footprint are those users with user equipment units 103 served by the same atmospheric platform 101. Such a footprint can encompass a metropolitan area requiring wireless communications services, for example. Referring to FIG. 2, if user equipment unit $103_1$ wishes to communicate with user equipment unit $103_2$, user equipment unit $103_1$ sends a wireless signal via the user link 106 to the atmospheric platform 101. The frequency of the signal between the atmospheric platform 101 and the user equipment unit $103_1$ must be such that the signal has acceptable strength either when received or transmitted by the atmospheric platform 101.

In a wireless broadband communications system such as might be implemented with the system 100 of the present invention, it is preferred that the frequency of the signals be under 100 GHz. In a wireless telephony system, it is preferred that the frequency of signals be less than 10 GHz and above 500 MHz to allow the use of inexpensive telephone sets. Thus, the present invention is capable of operating in a range of carrier frequencies from 500 MHz to 100 GHz of the electromagnetic spectrum, including microwave and millimeter wave carrier frequencies, and can provide data rates greater than one megabit per second to a given user located within the service area. In addition, the network 100 of the present invention can provide multi-media communications i.e., it can transact video, images, voice, sound, text, and data, and combinations thereof.

In the wireless examples above, it should be noted that 50 MHz of bandwidth can transmit 32 Mbps of data per beam. This is sufficient bandwidth to provide multi-media services to multiple subscribers within a given beam, who would share the information bandwidth offered by the beam, if implemented with a variable bandwidth processor.

The atmospheric platform 101 communicates directly with the gateway 104 through the wireless trunkline 108. The gateway 104 can be connected to a public switched telephone network (PSTN) 209, as illustrated in FIG. 2, or to any other existing communications infrastructure, which can provide access, for example, to the Internet, or to destinations well beyond the service area directly covered by footprint of the airborne antenna array subsystem of the atmospheric platform 101. Such other communications infrastructures include, by way of example, a fiber backbone, any variant of a wideband communications link, or to a wide area network. The gateway 104, 105 switches the information traffic of a given user using the source-to-destination switch 202.

Additionally, the airborne platform 101 can be equipped with antennas and transceiver equipment enabling data signals 211 to be routed to or received from satellites 212 orbiting above the airborne platform 101 or directly to/from other airborne platforms 214, as is further illustrated in FIG. 2. Therefore, user equipment units $103_1$, $103_2$ can communicate with other users outside of their own footprint by one or more of three techniques.

In a first technique, the user equipment unit $103_2$ wishing to communicate with another user outside of his or her own footprint sends a message via user link 106 to the network atmospheric platform 101 serving user equipment unit $103_2$. Then, the atmospheric platform 101 sends a wireless signal along the trunkline 108 to the gateway 104, again connected to either the PSTN 209 (or to a fiber backbone, or to a long-distance broadband or wideband link), which in turn conveys the message to a remote destination.

In a second technique, the user equipment unit $103_2$ likewise communicates via user links 106 to the network atmospheric platform 101. The payload of the atmospheric platform 101, in turn, likewise communicates via the wireless trunkline 108 to the gateway 104. Significantly, trunkline 108 can utilize a higher carrier frequency than a carrier frequency used by the user link 106 that links the atmospheric platform 101 and the user equipment unit $103_2$. The information traffic of the user $103_2$ that is sent to gateway 104 is switched at the gateway 104 and sent to a destination within the signal footprint 120 via the trunkline 108 uplink portion and the atmospheric platform 101. At the atmospheric platform 101, the information is sent to a specialized user equipment unit (not illustrated) that serves as a high bandwidth, large terminal operated by an information service business. The specialized user equipment unit or terminal is similar to standard user equipment terminals except that it is adapted for much higher data rates that typical user equipment units. The specialized user equipment unit can be connected to a variety of terrestrial networks or to a satellite communications facility, for example, that provides a connection to a destination beyond the signal footprint of the network 100.

In a third technique, the user equipment unit 1032 also communicates via the user link 106 to the atmospheric platform 101. The payload of the atmospheric platform 101, in turn, communicates via a wireless signal 211 with the satellite 212 or another airborne platform 214. Significantly, signal 211 can utilize a higher carrier frequency as compared to the carrier frequency used for linking the atmospheric platform 101 and the user equipment unit 103 (i.e., user link 106). The satellite 212 can be one of several in a collection or constellation of satellites, not illustrated in FIG. 2 for simplicity. At any given time, each atmospheric platform 101 serving the user equipment units $103_1$, $103_2$ within its unique footprint 120 can have an associated satellite 212 with which it communicates. Moreover, satellite 212 can communicate via wireless inter-satellite links (ISLs) to another satellite in the constellation. These ISLs typically utilize wide bands of spectrum at carrier frequencies much higher than typically utilized in terrestrial wireless communications. The satellite 212 can then communicate via a wireless signal 213 with the atmospheric platform 214, for example. Alternatively, the platform 101 can communicate directly with the platform 214 via a wireless signal 211. If the atmospheric platform 214 services a user 216 with whom user $103_2$ wishes to communicate, the data is delivered to its destination via a user link 217. Through the use of multiple, interconnected networks, both atmospheric and space, in accordance with the present invention, it is possible to provide wireless communications services between users at great distances, e.g., inter-continental distances, on the Earth.

Still referring to FIG. 2, the payload on atmospheric platform 101 or 214, respectively, can carry various types of antennas and antenna arrays. A first type of antenna array comprises a fixed array of many refractive lens antennas. The individual refractive antennas in the array are either copies of the same basic design or slight variants of a basic design each differing in aperture gain or effective F-number. Each of the refractive antennas in the array can provide multiple beams. The combination of the multiple beams produced by the array is used to create a beam pattern on the ground. The multiple beams enable frequency reuse. The beam pattern is typically cellular-like on the ground. Creation of cellular-like and other suitable beam patterns on the ground from an antenna above the ground for frequency reuse is known in the art. One skilled in the art would readily identify a number of techniques for implementing such a beam pattern using a fixed array. All such techniques and patterns are considered to be within scope of this invention.

A second type of antenna array has many single aperture "steerable" antennas, of a common, basic design, each with a two-axis angular pointing mechanism. The steerable antennas are used for providing beams that can be steered to fill in "holes" or areas within the array footprint where the first array either does not provide coverage or where additional spot coverage is desirable. An example of where additional coverage in a standard cellular beam pattern might occur is when a wireless link user requires a very high data rate on a dedicated basis. One of the antennas within the steerable array set could be pointed in the direction of that user while the cellular-like beam normally assigned to that geographical region would continue to provide service to other, normal data rate users. Another example of the use of the steerable array for filling holes in the beam pattern is when one or more of the antennas or the associated transceiver circuitry in the fixed array fails or becomes degraded. Under these circumstances, one or more of the antennas in the steerable antenna array could be pointed in a manner so as to "fill" in the hole left by the failure or degradation. Additionally, the steerable antennas can also be used to provide one or more beams that remain effectively stationary on the ground irrespective of movement of the atmospheric platform 101, 214. Such a capability allows the network to offer a dedicated beam to one or more users within the beam spot being maintained on the fixed location on the ground. One skilled in the art would readily recognize a variety of antennas and antenna arrays, both fixed and steerable that could be used on the atmospheric platform 101. All of these antennas and antenna array are within the scope of the present invention.

Moreover, the beams produced by the airborne antenna array are arranged in a suitable reuse pattern within the footprint 120 on the ground. Typically a cellular-like frequency reuse pattern is preferred. The cellular-like pattern thus created by the antennas on the atmospheric platform 101, may be fixed, i.e., stationary in their motion, either relative to the atmospheric platform 101 or to the ground. When refractive lens arrays are used to create the reuse pattern, the beams are generally fixed relative to the atmospheric platform 101 and the reuse pattern will move (i.e., rotate and translate) on the ground as the atmospheric platform 101 moves along its flight path. Information from the ground-based user equipment units 103 are encoded and sent in packets to the atmospheric platform 101. The connection between user equipment units $103_i$ is handled by the payload equipment on the platform 101, specifically the software and switching capability, that perform the hand-off of the information path between beams as the pattern sweeps across the ground.

In contrast, steerable beams can be steered to remain stationary on the ground as the atmospheric platform 101 follows its nominal flight path. However, on occasion, the platform 101 may experience an anomalous flight condition wherein its angular orientation may change quickly and by a significant amount. In such a scenario, the connection between user equipment units 103 is re-established by the payload equipment on the platform 101 and the switching capability of the switch 202 located at the gateway 104, once the steerable beam is returned to its desired location on the ground. The seven-tone methodology described in the co-pending applications is at least five times faster than such disruptions and thus, is sufficiently fast to maintain data continuity.

To establish communications among user equipment units $103_2$ or to provide connectivity between user equipment units 103 within the network and terminals outside the network, the user equipment units 103 communicate with the atmospheric platform 101 which, in turn, relays the signal to the gateway 104 via the trunkline 108 as described herein above. The payload or payload pod carried by the atmospheric platform 101 provides the necessary functionality for aggregating or multiplexing a plurality of signals received by the airborne antenna array into the downlink portion of the trunkline 108. In addition the payload pod converts the carrier frequencies of the received user links 106 to that of the carrier frequency of the downlink portion of the trunkline 108. The gateway 104 receives the downlink portion of the trunkline 108, downconverts, demultiplexes and decodes the received data to determine the destination address of user data. The gateway 104 then fast packet switches (FPS) the data or otherwise routes the data to an appropriate output port. Data at the gateway 104 output port are remodulated, upconverted to the gateway uplink frequency and retransmitted or uplinked to the atmospheric platform 101 via the uplink portion of the trunkline 108. Finally, in the payload pod the uplinked signals are converted back to the appropriate user link carrier frequencies and transmitted via an appropriate destination beam to the intended recipient 103, 216 in or out of the footprint 120, respectively.

Within the network of system 100, user equipment units 103 continually acquire new user link beams as the atmospheric platform 101 moves and transmit packets that associate their unique addresses with current beam frequencies. These data are used in the gateway 104 to update a packet switch's routing table that maintains the database of destination addresses and downlink frequencies. The user links 106 and trunkline downlinks 108 incorporate RF beacon subsystems that transmit signals to facilitate data beam acquisition by the respective ground terminals. Beacon signals contain control/status packets that include network time synchronization data, beam information, aircraft location, heading, velocity, and attitude admission control information, and network status. User-link signals also include a unique tone in each downlink frequency that enables user equipment units 103 to uniquely identify the beam selected for communications.

In a preferred embodiment, each beam on the atmospheric platform 101 and each user link 106 contain narrowband order wire channels. The term "order wire channel" as used herein refers to a narrowband signal that is used to provide an address to an antenna beam. For example, consider the case where the spectrum allocated to user links 106 is divided into seven frequency bands, each frequency band being associated with a beam of the airborne antenna. Further, consider that there are 23 sets or clusters of these seven frequency groups that make up the entire antenna pattern footprint. Then the total number of beams covering the entire area will be 161. If, in this example, there are 32 Mbps of data capacity in each frequency group, the total one-way capacity of the network of the system 100 will be 5.216 Gbps. Each of the seven beams in each of the 23 clusters has a unique frequency tone identifying the beam (i.e. the beam order wire channel).

In this example, the transmitting user equipment unit 103 samples the beam order wire channel at each of the seven frequencies. The user equipment unit 103 selects the strongest signal, that is the beam address with the best link to the atmospheric platform 101. The user equipment unit 103 then uses the order wire channel to send its (i) beam address, (ii) a terminal equipment number, (i.e., its network address much like a telephone number) and (iii) the destination terminal number or address that the user wishes to contact. This information is transmitted to the airborne platform 101 airborne trunkline antenna, downlinked, and sent to the gateway 104 via the trunkline 108. The switch and associated processing at the gateway 104 records the beam address, the transmitting user number and the recipient number. The switch 202 then "connects" the users at the gateway 104 and uplinks the signal through the trunkline 108 to the appropriate antenna beam associated with the recipient. The term "connect" as used herein can mean either to establish a circuit between a pair of user equipment units 103 or to route packets of data based on packet header information. Alternatively, the switch 202 routes the signal via an external link to the network, such as the PSTN. If the signal is uplinked through the trunkline 108, the payload of the atmospheric platform 101 subsequently transmits the data to the desired address within the network. All user equipment units 103 are continuously switching frequencies and identifying their respective beam addresses via the order wire channels whether transmitting data or not. In this manner, the gateway 104 switch is always keeping track of the beam locations and user locations within the network of the system 100. The above-described details of network operation are for illustrative purposes only. One skilled in the art would readily recognize alternative techniques all of which are within the scope of the present invention.

During network operation, the atmospheric platform 101 typically flies in shifts over a particular area requiring communications services. For example, a particular atmospheric platform 101 might fly over an area for an 8-hour shift, after which time a second atmospheric platform (in turn, carrying its own payload) would take over for a second 8-hour shift, followed by a third atmospheric platform (again carrying its own payload). Thus, the network of the system 100 can provide continuous service to an area, 24 hours per day, 7 days per week, by using atmospheric platforms 101 operating in overlapping shifts. Operationally, the same platform 101 used in the first shift, could be used for a third and final 8-hour shift in a 24-hour cycle, thereby requiring only two atmospheric platforms 101 for servicing a given area. Shifts can range from 8 to 18 hours in length.

The handover or operational signal transmission transfer between atmospheric platforms 101 is critical to the continuity of the data streams carried by the network system 100 of the present invention. The handover can be accomplished without interruption in network function by carefully orchestrating the handover process. For example, one technique of accomplishing handover begins when the second atmospheric platform, the relief platform, approaches the atmospheric platform 101 currently on-station and servicing the network users. The relief atmospheric platform will fly in echelon to within 500 feet to 1,500 feet of the current atmospheric platform 101 that is being relieved. GPS systems on both of these atmospheric platforms will then be used to compute the separation between the platforms. When it is determined that an appropriate separation between the platforms has been achieved, the second atmospheric platform will automatically activate a beacon signal. All user equipment units 103 and gateways 104, 105 with tracking antennas within the network of the system 100 will then automatically track the centroid of both of these atmospheric platforms. The gateway 104 switching equipment will then simultaneously shut down the payload of the retiring aircraft 101 and activate the payload of the replacement atmospheric platform. This methodology for handover works for the network of the system 100 of the present invention because the atmospheric platforms are within the acquisition of all ground terminals or user equipment units 103 and active gateway(s) 104, 105.

The atmospheric platform 101 with its payload pod and the gateway(s) 104, 105 house all major elements required by the communications network of the system 100 of the invention, except for the user equipment units 103. More specifically, the payload pod comprises an airborne antenna array subsystem 301, a payload portion, of a downlink apparatus 300, and a payload portion of an uplink apparatus 600 and an airborne trunkline antenna subsystem 310. Additionally, either the payload pod or, alternately the atmospheric platform 101 itself, comprises an electrical power generation unit, such as an auxiliary power unit (APU), an electrical power conditioning and distribution buss, environmental control and thermal conditioning equipment, and position and attitude sensing equipment. The payload pod further comprises additional components, systems, hardware and software, necessary for providing reliable point-to-point and point-to-multipoint wireless services to a large geographic area from a single communications network node, as is known in the art.

According to the method 700 of the present invention, the payload portion of the downlink 300 apparatus receives (701) signals from the airborne antenna array subsystem 301. The payload portion of the downlink apparatus 300 relays (step 702) the received signals to the gateway 104. The payload portion of the downlink apparatus 300 relays 702 the received signals by aggregating (step 703) and frequency shifting (step 704) the signals received therefrom, then frequency converting (step 705) the signals. The aggregated, frequency shifted and converted signals are then passed to the airborne trunkline antenna subsystem 310. The airborne trunkline antenna subsystem 310, in turn, transmits (step 705) the signals to the gateway 104 via the downlink portion of the trunkline 108.

The gateway 104 comprises a gateway portion of the downlink apparatus 400, a gateway portion of the uplink apparatus 500 as well as an antenna subsystem 114 and the source-to-destination switching and network processing equipment 202 as described herein above. The antenna subsystem 114 of the gateway 104 receives signals carried by the downlink portion of the trunkline 108 from the platform 101 and applies the signals to the gateway portion of the downlink apparatus 400 for routing (step 710). The gateway portion of the downlink apparatus 400 de-aggregates or demultiplexes (step 712) and frequency shifts (714) the signals. Once de-aggregated and downconverted, the signals are passed to the source-to-destination switching and network processing equipment 202 in the gateway 104 for demodulation and switching (step 716) by the source-to-destination switch 202. The demodulated signals are passed to the gateway antenna subsystem 114 for relaying (step 717) or transmission either back to the platform 101 or to other existing infrastructure mentioned previously.

The gateway portion of the uplink apparatus 500 receives signals (step 720) transmitted (step 718) from the source-to-destination switch 202 of the gateway 104, aggregates (step 722) and upconverts (step 724) these signals and sends the resulting signal produced therefrom to the gateway antenna subsystem 114 for transmission (step 726) to the atmospheric platform 101 via the uplink portion of the trunkline 108. The airborne trunkline antenna subsystem 310 receives (step 730) the signals of the uplink portion of the trunkline 108 and applies the signals to the payload portion of the uplink apparatus 600. The payload portion of the uplink apparatus 600 subsequently de-aggregates (step 732) the signals and routes (step 734) them to appropriate input ports of the airborne antenna array subsystem 301 for transmission (step 735) via one of the plurality of beams to one or more of the user equipment units 103 within the footprint 120 of the system 100 of the present invention.

Figure 3:
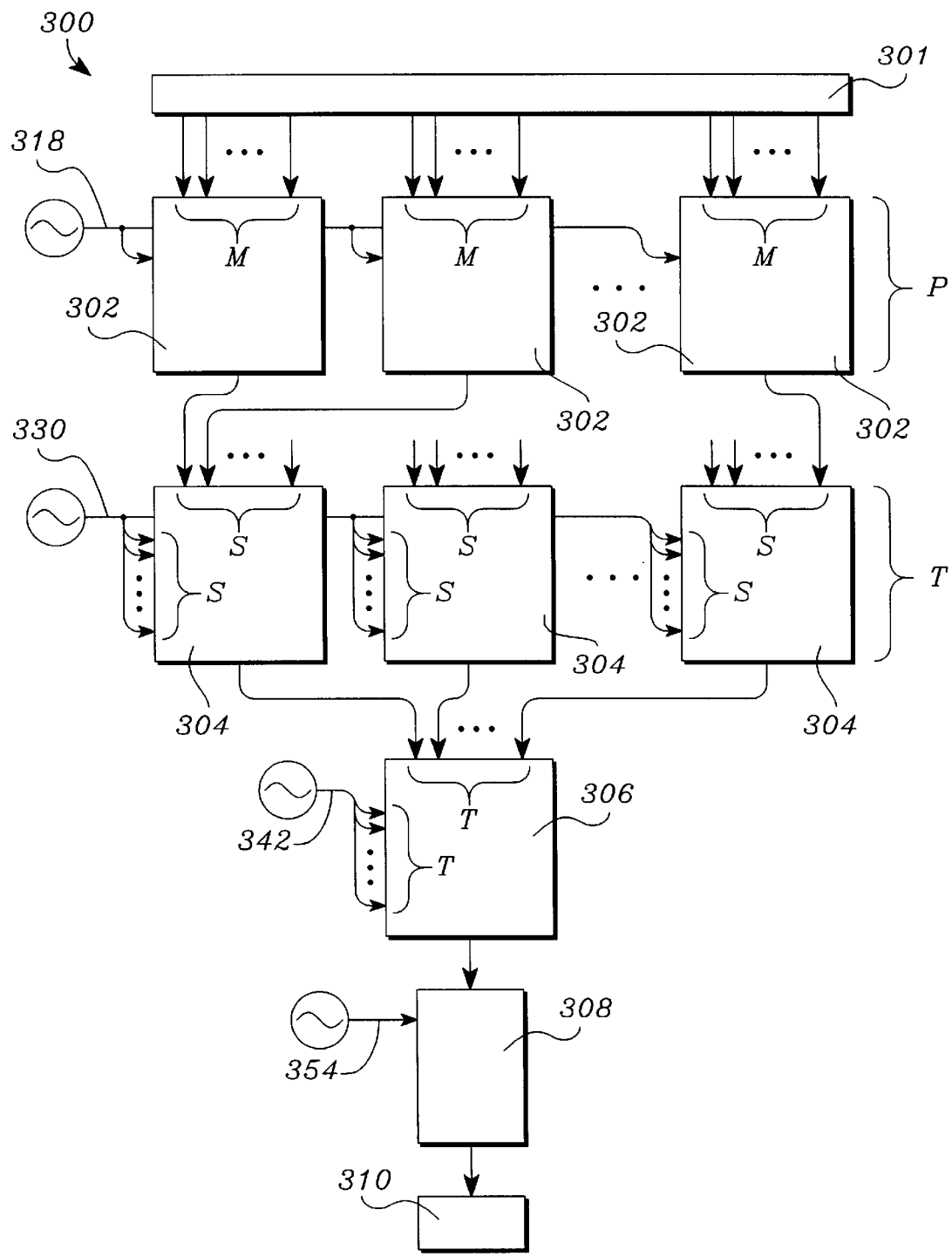
FIG. 3 illustrates a block diagram of the payload portion of the downlink apparatus of the present invention.

A preferred embodiment of the payload portion of the downlink apparatus 300 of the system 100, according to the present invention, is illustrated FIG. 3. The payload portion of the downlink apparatus 300 receives 701 signals from the airborne antenna array subsystem 301. The signals received thereby are processed (frequency shifted 704 and aggregated 703) and applied 706 to the airborne trunkline antenna subsystem 310.

The payload portion of the downlink apparatus 300 comprises P first frequency conversion multiplexers 302. Each of the first frequency conversion multiplexers 302 has M input ports and one output port. According to the method 700, he first frequency multiplexer 302 aggregates 703 M input signals into a single output signal. The first frequency multiplexer 302 also shifts the frequency 704 of the M input signals to a set of output frequencies centered at a first IF frequency. In the preferred embodiment, the M input signals are each at one of M different frequencies of the frequency reuse scheme of the network of system 100. Therefore, the first IF signal at the output of the first frequency conversion multiplexer 302 is comprised of a set of M signals spread out over a first IF frequency band. The product M*P equals N where N is greater than or equal to the number of outputs or equivalently, the beams of the airborne antenna array subsystem 301. A first local oscillator (LO) signal 318 is applied to an LO input of each of the P first frequency conversion multiplexers 302.

The payload portion of the downlink apparatus 300 further comprises T second frequency conversion multiplexers 304. Each of the second frequency conversion multiplexers 304 has S input ports and one output port. The second frequency multiplexer 304 aggregates 703 S input signals into a single output signal and shifts the frequency 704 of the S input signals such that each of the S input signals is centered at a different frequency within a second IF frequency range covered by the output signal present at the output of the second frequency conversion multiplexer 304. The output signal is centered at a second IF frequency. There are S LO inputs on each of the second frequency conversion multiplexers 304. One of a set of S second LO signals 330 is applied to the each of the S LO inputs. The S second LO signals 330 differ in frequency such that the S input signals are each converted to a different portion of the second IF frequency range.

The payload portion of the downlink apparatus 300 further comprises a single third frequency conversion multiplexer 306. The third frequency conversion multiplexer 306 has T input ports and one output port. The third frequency multiplexer 306 aggregates 703 T input signals into a single output signal and shifts the frequency 704 of the T input signals such that each of the T input signals is centered at a different frequency within a third IF frequency range covered by the output signal present at the output port of the third frequency conversion multiplexer 306. The output signal is centered at a third IF frequency. There are T LO inputs of the third frequency conversion multiplexer 306. One of a set of T third LO signals 342 is applied to each of the T LO inputs. The T third LO signals 342 differ in frequency such that the T input signals are each converted to different portions of the third IF frequency range.

The payload portion of the downlink apparatus 300 further comprises an output frequency converter 308. The output frequency converter 308 converts 705 signals within the third IF frequency range to a signal centered at a final or fourth IF frequency. The center frequency of the fourth IF frequency equals the center frequency of the downlink portion of the trunkline 108. A fourth LO 354 signal is applied to an LO input on the output frequency converter 308 to accomplish the frequency conversion. An output signal from the output frequency converter 308 is sent to the airborne trunkline antenna subsystem 310 for transmission 706 as the downlink portion of the trunkline 108.

Figure 4:
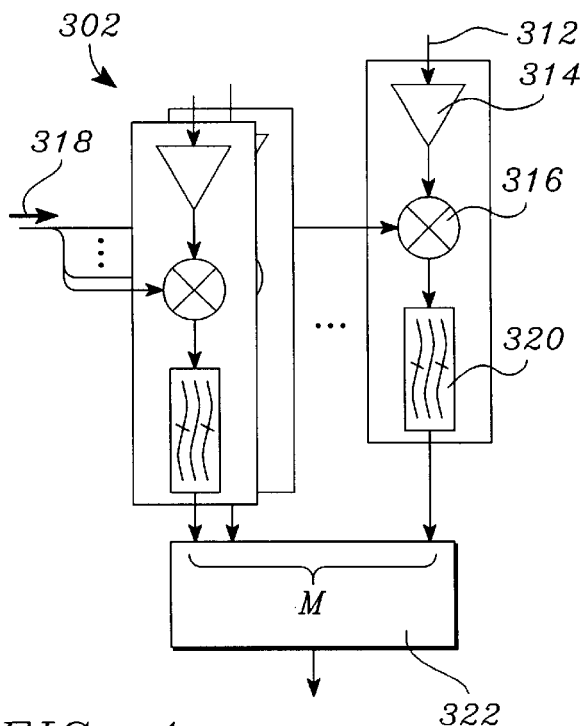
FIG. 4 illustrates a block diagram of a first frequency conversion multiplexer according to the present invention.

FIG. 4 illustrates a block diagram of the first frequency conversion multiplexer 302. Each of the M input ports 312 is connected to a first or channel amplifier 314 that is connected to an RF input of one of M first mixers 316. A first local oscillator signal 318 is applied to an LO input of each of the M first mixers 316. An IF output of each of the M first mixers 316 is connected to one of M first or channel bandpass filters 320. Each of the M first bandpass filters 320 is connected to an M:1 multiplexer 322. An M:1 multiplexer 322 is a device known in the art that combines M input signals into a single output signal. An output of the M:1 multiplexer 322 is connected to an output port of the first frequency conversion multiplexer 302.

Figure 5:
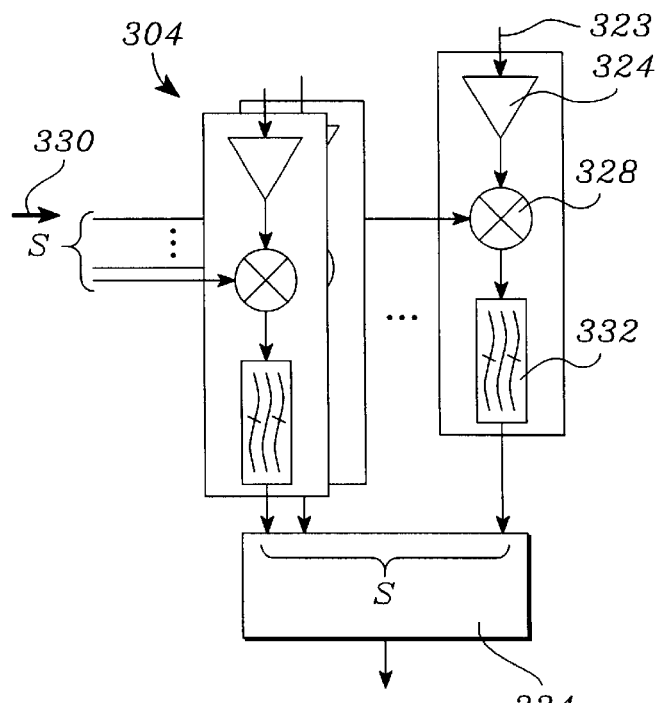
FIG. 5 illustrates a block diagram of a second frequency conversion multiplexer according to the present invention.

FIG. 5 illustrates a block diagram of the second frequency conversion multiplexer 304. Each of the S input ports 323 is connected to one of a set of S second amplifiers 324. The second amplifiers 324, in turn, are connected to an RF input of one of a set of S second mixers 328. One of the S second local oscillator signals 330 is applied to an LO input of each of the S second mixers 328 such that a different LO frequency or signal is applied to each of the second mixers 328. An output of each of the S second mixers 328 is filtered by one of S second bandpass filters 332. Each of the S second bandpass filters 332 is connected to an input of an S:1 multiplexer 334. An output of the S:1 multiplexer 334 is connected to an output port of the second frequency conversion multiplexer 304.

Figure 6:
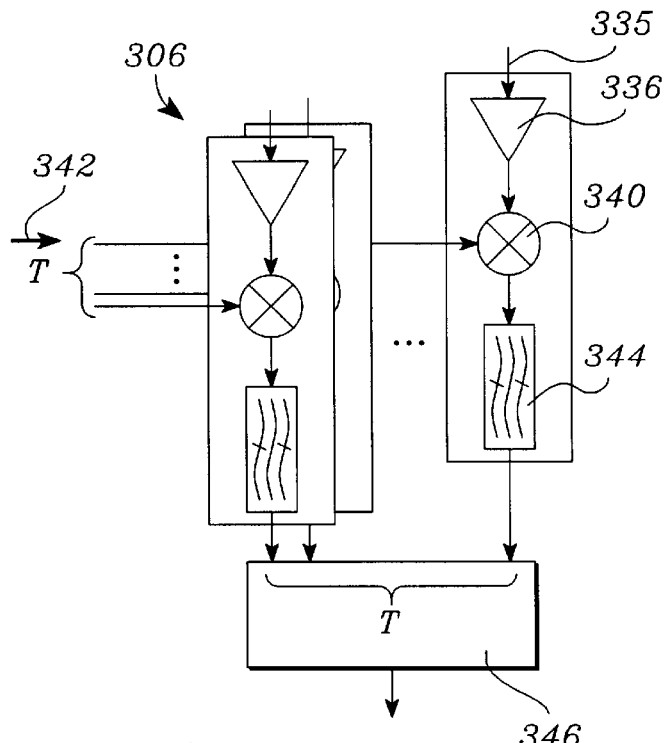
FIG. 6 illustrates a block diagram of a third frequency conversion multiplexer according to the present invention.

FIG. 6 illustrates a block diagram of the third frequency conversion multiplexer 306. Each of the T input ports 335 is connected to one of a set of T third amplifiers 336. The third amplifiers 336, in turn, are connected to an RF input of one of of set of T third mixers 340. One of the T third local oscillator signals 342 is applied to an LO input of each of the T third mixers 340 such that a different LO frequency is applied to each of the third mixers 340. An output of each of the T third mixers 340 is filtered by one of T third bandpass filters 344. Each of the T third bandpass filters 344 is connect to an input of a T:1 multiplexer 346. An output of the T:1 multiplexer is connected to an output port of the third frequency conversion multiplexer 306.

Figure 7:
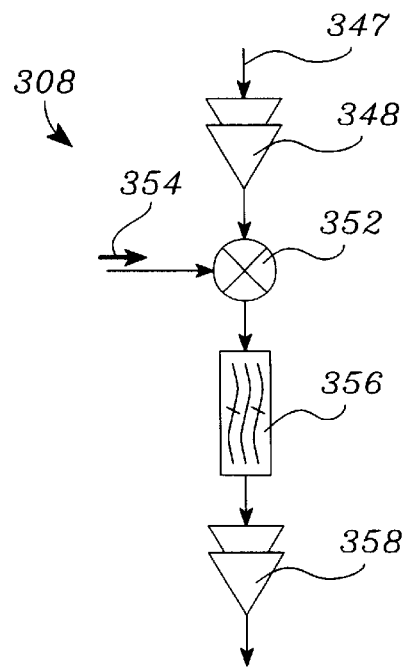
FIG. 7 illustrates a block diagram of a final frequency converter according to the present invention.

FIG. 7 illustrates a block diagram of the output frequency converter 308. The input port 347 of the output frequency converter 308 is connected to a fourth amplifier 348. An output of the fourth amplifier 348 is connected to an RF input of a fourth mixer 352. The fourth LO signal 354 is applied to an LO input of the fourth mixer 352. An IF output of the fourth mixer 352 is filtered by a fourth bandpass filter 356 and then amplified by a fifth amplifier 358. An output of the fifth amplifier, in turn, is connected to an output port of the output frequency converter 308.

The output port of the output frequency converter 308 is connected to the airborne trunkline antenna subsystem 310. The airborne trunkline antenna subsystem 310 preferably comprises a left hand circularly polarized (LHCP) antenna for transmitting signals output by the payload portion of the downlink apparatus 300 to the gateway 104 via the downlink portion of the trunkline 108.

FIGS. 3 through 7 also show an example of the payload portion of the downlink apparatus 300 adapted for the processing of the twenty-three sets of seven frequencies described in the example hereinabove. In the example illustrated, N=157, M=7, P=23, S=6, and T=4. More generally, N can range from between 1 and greater than 2,000, M ranges between 1 and 512, P ranges between 1 and 1024, S ranges between 1 and 512, T ranges between 1 and 512.

Furthermore in the example, the seven frequency bands of the transmit or downlink portion of the user links 106 are, for example, spaced at 50 MHz intervals starting at starting at 27.525 GHz and extending to 27.825 GHz to form a 350 MHz frequency span or bandwidth. The 350 MHz bandwidth for the receive or uplink portion of the user links 106 is assumed to extend from 28.525 MHz to 28.825 MHz in 50 MHz increments. The first LO 318 has a frequency of 28 GHz and there are seven (M=7) different first bandpass filters 320 each with 50 MHz bandwidths but each centered at a different one of seven bands extending from center frequency values from 525 MHz to 825 MHz in 50 MHz steps. The seven groups of 50 MHz signals are combined by the 7:1 multiplexer 322. There are twenty-three (P=23) of the first frequency conversion multiplexers 302 forming a total of twenty-three like frequency segments of 350 MHz bandwidth.

Furthermore, in this example there are four (T=4), second frequency conversion multiplexers 304 each of which has six input ports (S=6). One of the inputs on one of the second frequency conversion multiplexers 304 is terminated since it is not needed (i.e. 4*6=24 which is greater than the 23 required by this example). The first IF has a center frequency of 675 MHz and a bandwidth of 350 MHz. There are six, second LO signals 330 with frequencies from 1.85 GHz to 3.60 GHz. Six, second bandpass filters 332 are used, each having a bandwidth of 350 MHz and each centered at one of six different frequencies from 2.525 GHz to 4.275 GHz chosen in 350 MHz steps.

Still furthermore, there is only one, third frequency conversion multiplexer 306 with four input ports in this example of the payload portion of the downlink apparatus 300. The second IF at the input of the third frequency conversion multiplexer 306 has a center frequency of 3.40 GHz and a bandwidth of 2.10 GHz corresponding to the frequency range of the signals received from the four, second frequency conversion multiplexers 304. There are four, third LO signals 342 with frequencies from 7.65 GHz to 13.95 GHz chosen in 2.10 GHz steps (i.e. 7.65 GHz, 9.75 GHz, 11.85 GHz, and 13.95 GHz). Four, third bandpass filters 344 are used, each having a bandwidth of 2.10 GHz and each centered at one of four different frequencies from 11.05 GHz to 17.35 GHz (i.e. 11.05 GHz, 13.15 GHz, 15.25 GHz and 17.35 GHz) corresponding to the center frequencies of the signals output by the mixers 340.

The third IF at the input to the output frequency converter 308 has a center frequency of 1.42 GHz and a bandwidth of 8.4 GHz in this example. A fourth LO signal 354 with a frequency of 60 GHz is used to convert the 8.4 GHz wide band of signals received from the third frequency conversion multiplexer 306 from a center frequency of 14.2 GHz to a center frequency of the fourth IF at 74.2 GHz for this example. The fourth bandpass filter 356 has with a center frequency of 74.2 GHZ and having a bandwidth of 8.4 GHz, the bandwidth of the fourth IF. The center frequency and bandwidth of the fourth IF corresponds to that of the downlink portion of the trunkline 108.

The example hereinabove is a specific implementation of the payload portion of the downlink apparatus 300. Other suitable combinations of frequency ranges, bandwidths and LO frequencies would be readily recognized by one skilled in the art. All other combinations are considered to be within the scope of this invention. Additionally the example is not intended to limit in any way the scope of the downlink apparatus 300 of the present invention.

Figure 8:
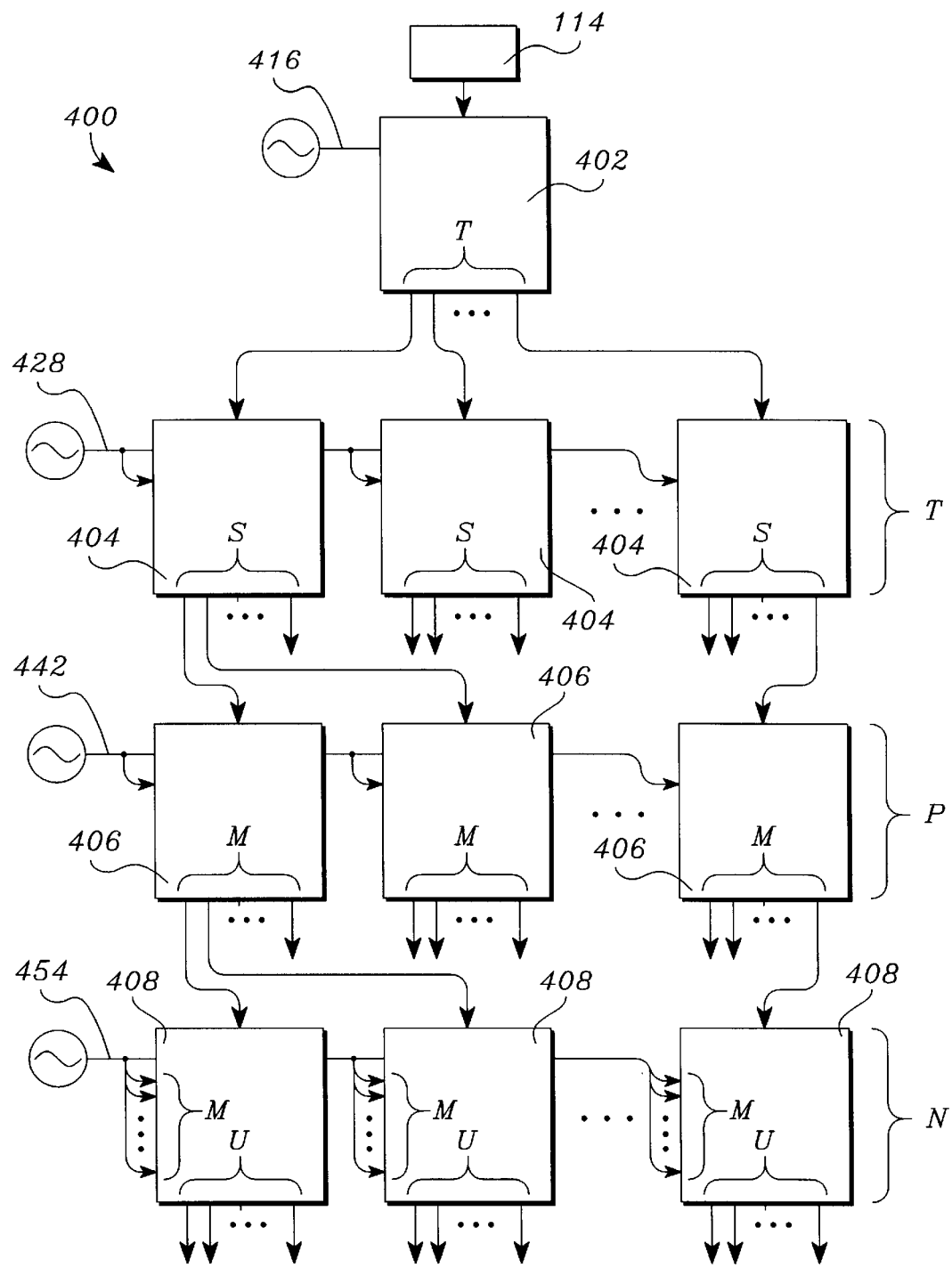
FIG. 8 illustrates a block diagram of a gateway portion of the downlink apparatus of the present invention.

A preferred embodiment of the gateway portion of the downlink apparatus 400 is illustrated in FIG. 8. The gateway portion of the downlink apparatus 400 receives 710 a signal from the gateway antenna subsystem 401. The gateway antenna subsystem preferably comprises an LHCP antenna that is capable of tracking the atmospheric platform 101.

The gateway portion of the downlink apparatus 400 comprises a first frequency conversion demultiplexer 402. The first frequency conversion demultiplexer 402 has one input port and T output ports. A signal from the gateway antenna subsystem 401 is received by the first frequency conversion demultiplexer 402. The signal is frequency shifted 714 and demultiplexed 712or separated into T output signals each of which has a different center frequency within a fifth IF frequency range or band. The fifth IF frequency band is centered at a fifth IF center frequency. A fifth LO signal 416 is applied to an LO input of the first frequency conversion demultiplexer 402.

The gateway portion of the downlink apparatus 400 further comprises up to T second frequency conversion demultiplexers 404. The second frequency conversion demultiplexers 404 each have one input port and S output ports. Each of the up to T second frequency conversion demultiplexers 404 is connected to one of the T outputs of the first frequency conversion demultiplexers 402. Signals received from the first frequency conversion demultiplexer 402 are frequency shifted 714 by the second frequency conversion demultiplexer 404 and demultiplexed 712 into S output signals, each of which has a different center frequency within a sixth IF frequency range. The sixth IF frequency band is centered at a sixth IF center frequency. A sixth LO signal 428 is applied to an LO input of the second frequency conversion demultiplexers 404.

The gateway portion of the downlink apparatus 400 further comprises up to P third frequency conversion demultiplexers 406 where P equals the product of S times T. The third frequency conversion demultiplexers 406 each have one input port and M output ports. Signals received from the second frequency conversion demultiplexer 404 are frequency shifted 714 by the third frequency conversion demultiplexer 406 and demultiplexed 712 into M output signals, each of which has a different center frequency within a seventh IF frequency range. The seventh IF frequency band is centered at a seventh IF center frequency. A seventh LO signal 442 is applied to an LO input of the third frequency conversion demultiplexers 406.

The gateway portion of the downlink apparatus 400 further comprises up to N fourth frequency conversion demultiplexers 408 where N equals the product of P times M. The fourth frequency conversion demultiplexers 408 each have one input port and U output ports. Signals received from the third frequency conversion demultiplexer 406 are frequency shifted 714 by the fourth frequency conversion demultiplexer 408 and demultiplexed 712 into U output signals each of which has a different center frequency within a eighth IF frequency range. The eighth IF frequency band is centered at an eighth IF center frequency. A eighth LO signal 454 comprises a set of M frequency tones one of which is applied to each of the M LO inputs of the fourth frequency conversion demultiplexers 408. Signals from the U times N output ports from the N fourth frequency conversion demultiplexers 408 are routed to the gateway switch 202 for demodulation 716 and switching 717.

Figure 9:
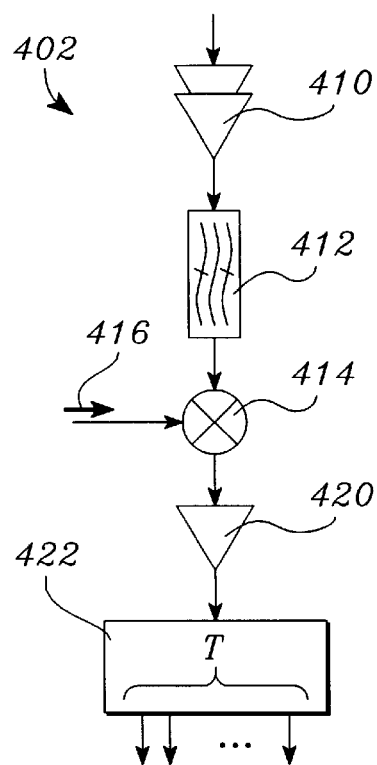
FIG. 9 illustrates a block diagram of a first frequency conversion demultiplexer according to the present invention.

FIG. 9 illustrates a block diagram of the first frequency conversion demultiplexer 402. Signals received by the first frequency conversion demultiplexer 402 are first amplified by a low noise amplifier (LNA) 410 and then filtered by a fifth bandpass filter 412. Preferably, the LNA 410 has a noise figure of 5 dB or less. The fifth bandpass filter 412 is preferably the same design as the fourth filter 356. The filtered signals are then applied to an RF port of a fifth mixer 414 where the signals are frequency shifted to be within the fifth IF frequency range. The signals exit the fifth mixer 414 and are amplified by a seventh amplifier 420 and demultiplexed by a 1:T filter demultiplexer 422. The signals are separated by the action of the 1:T filter demultiplexer 422 into T separate signal band center frequencies centered at T different frequencies. The fifth LO signal 416 is applied to an LO port of the fifth mixer 414 to accomplish frequency conversion of the signals.

Figure 10:
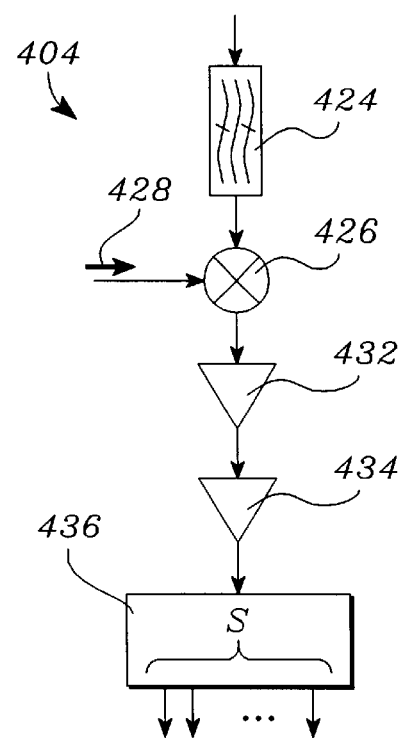
FIG. 10 illustrates a block diagram of a second frequency conversion demultiplexer according to the present invention.

FIG. 10 illustrates a block diagram of the second frequency conversion demultiplexer 404. A sixth bandpass filter 424 first filters signals received by the second frequency conversion demultiplexer 404. The sixth bandpass filter 424 or each of the T second frequency conversion demultiplexers 404 has a center frequency equivalent to one of the T separate signal band center frequencies of the first frequency conversion demultiplexer 402. The filtered signals are then applied to an RF port of a sixth mixer 426 wherein the signals are frequency shifted to be within the sixth IF frequency range. The signals exit the sixth mixer 426 and are amplified first by an eighth amplifier 432 and then by an automatic gain control (AGC) amplifier 434. The amplified signals are then separated by the action of a 1:S filter demultiplexer 436 into S separate signal bands centered at S different frequencies. The sixth LO signal 428 is applied to an LO port of the sixth mixer 426 to accomplish frequency conversion of the signals.

Figure 11:
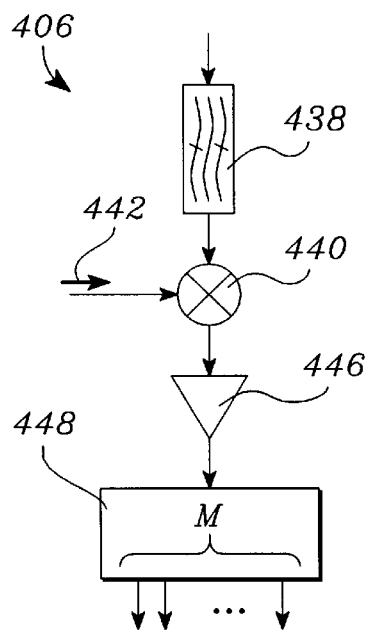
FIG. 11 illustrates a block diagram of a third frequency conversion demultiplexer according to the present invention.

FIG. 11 illustrates a block diagram of the third frequency conversion demultiplexer 406. A seventh bandpass filter 438 first filters signals received by the third frequency conversion demultiplexer 406. The seventh bandpass filter 438 of each of the P third frequency conversion demultiplexers 406 has a center frequency equivalent to one of the S separate signal band center frequencies of the second frequency conversion demultiplexer 404. The filtered signals are then applied to an RF port of a seventh mixer 440 wherein the signals are frequency shifted to be within the seventh IF frequency range. The signals exit the seventh mixer 440 and are amplified by a ninth amplifier 446. The amplified signals are then separated by the action of a 1:M filter demultiplexer 448 into M separate signal bands centered at M different frequencies. The seventh LO signal 442 is applied to an LO port of the seventh mixer 440 to accomplish frequency conversion of the signals.

Figure 12:
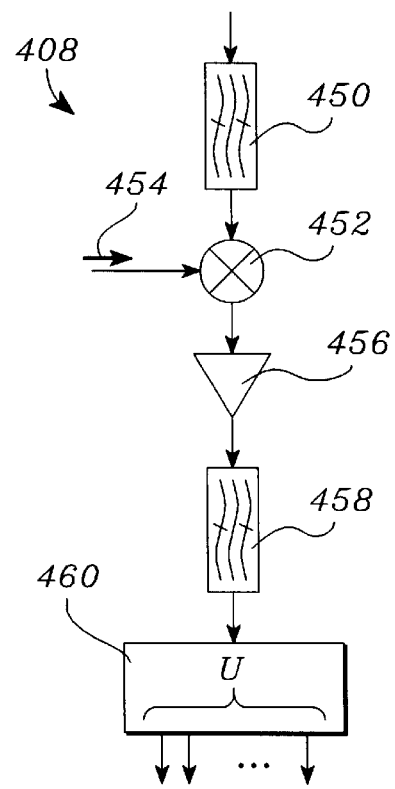
FIG. 12 illustrates a block diagram of a fourth frequency conversion demultiplexer according to the present invention.
Figure 13:
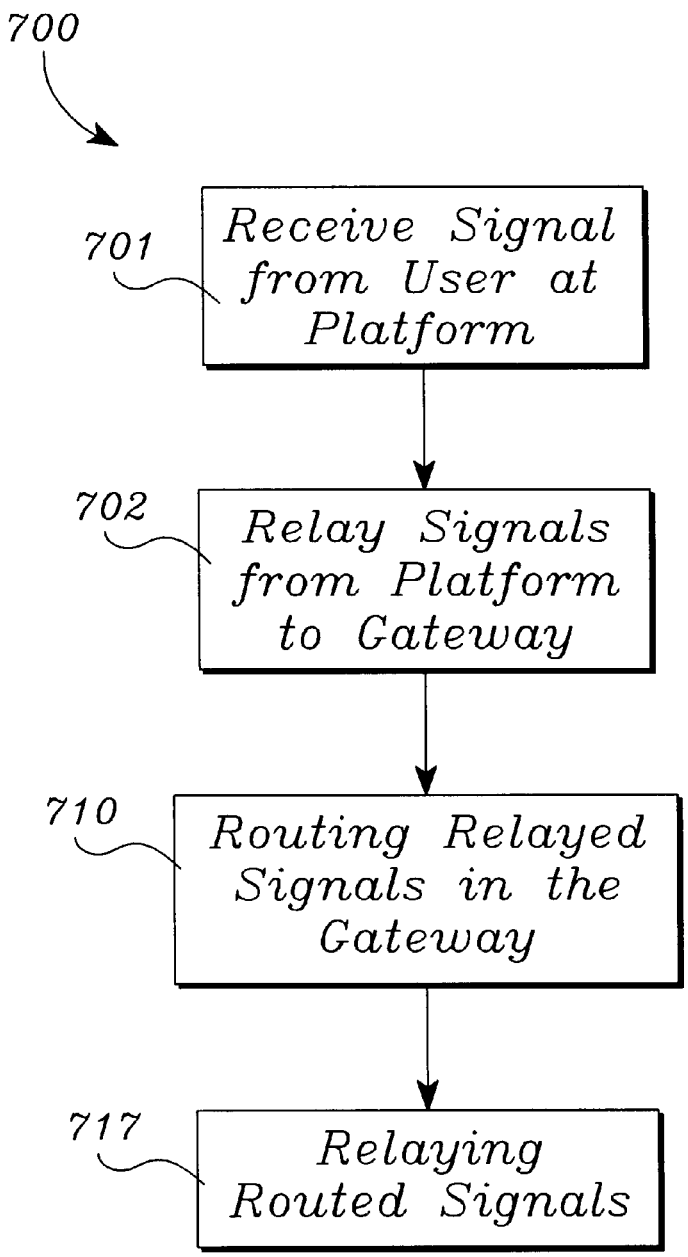
FIG. 13 illustrates a block diagram of the method of the present invention.

FIG. 12 illustrates a block diagram of the fourth frequency conversion demultiplexer 408. An eighth bandpass filter 450 first filters signals received by the fourth frequency conversion demultiplexer 408. The eighth bandpass filter 450 of each of the N fourth frequency conversion demultiplexers 408 has a center frequency equivalent to one of the M separate signal band center frequencies of the third frequency conversion demultiplexer 406. The filtered signals are then applied to an RF port of a eighth mixer 452 wherein the signals are frequency shifted to be within the eighth IF frequency range. The signals exit the eighth mixer 452 and are amplified by a tenth amplifier 456. The amplified signals are then filtered by a ninth bandpass filter 458 and separated by the action of a 1:U filter demultiplexer 460 into U separate signal bands centered at U different frequencies within the eighth IF Frequency range. The eighth LO signal 454 comprises M different frequency tones. One of the M LO tones or frequency signals is applied to an LO port of the eighth mixer 452 to accomplish frequency conversion of the signals. The choice of which of the M tones to apply to a given fourth frequency conversion demultiplexer 408 is determined by which of the corresponding output ports of the third frequency conversion demultiplexer 406 is providing the input signal to the fourth frequency conversion demultiplexer 408.

FIGS. 8 through 12 also show an example of the gateway portion of the downlink apparatus 400 adapted for the processing of the twenty-three sets of seven frequencies described in the example hereinabove for the payload portion of the downlink apparatus 300. As before, in this example of the apparatus 400, N=157, M=7, P=23, S=6, and T=4. In the example, U=16. Preferably, U ranges from 1 to 512. The signal received from the gateway antenna subsystem 401 by the gateway portion of the downlink apparatus 400 is centered at 74.2 GHz with a bandwidth of 8.4 GHz. Therefore, the fifth bandpass filter has a bandwidth of 8.4 GHz and a center frequency of 74.2 GHz. The fifth LO signal 416 has a frequency of 60 GHz and when mixed with the filtered signal from the fifth bandpass filter 412 produces the fifth IF centered at 14.2 GHz. The 1:T filter demultiplexer 422 has four (T=4) outputs each having a bandwidth of 2.10 GHz and each output having a frequency centered at either 11.05 GHz, 13.15 GHz, 15.25 GHz or 17.35 GHz.

There are four, second frequency conversion demultiplexers 404. The sixth bandpass filters 424 all have bandwidths of 2.10 GHz and center frequencies of either 11.05 GHz, 13.15 GHz, 15.25 GHz or 17.35 GHz corresponding to which output of the first frequency conversion demultiplexer 402 is connected to the given second frequency conversion demultiplexer 404. The sixth LO signal 428 has a frequency of 10.8 GHz and when mixed with the filtered signal from the sixth bandpass filter 424 produces and output at the sixth IF centered at 3.40 GHz. The 1:S filter demultiplexer 436 has six (S=6) outputs each having a frequency centered between 2.525 GHz and 4.275 GHz at 350 MHz steps.

There are twenty-three (P=23) third frequency conversion demultiplexers 406. The seventh bandpass filters 438 all have bandwidths of 350 MHz and center frequencies at one of either 2.525 GHz, 2.875 GHZ, 3.225 GHz, 3.575 GHz, 3.925 GHz, or 4.275 GHz corresponding to which output of the second frequency conversion demultiplexer 404 is connected to the particular third frequency conversion demultiplexer 406. The seventh LO signal 442 has a frequency of 3.60 GHz and when mixed with the filtered signal from the seventh bandpass filter 438 produces an output at the seventh IF centered at 675 MHz. The 1:M filter demultiplexer 448 has seven outputs each having a frequency centered between 525 MHz and 825 MHz with 50 MHz spacing.

Finally there are one hundred sixty one (161) fourth frequency conversion demultiplexers 408. The eighth bandpass filters 450 all have bandwidths of 50 MHz and center frequencies at one of either 525 MHz, 575 MHz, 625 MHz, 675 MHz, 725 MHz, 775 MHz, or 825 MHz, corresponding to which output of the third frequency conversion demultiplexer 406 is connected the particular fourth frequency conversion demultiplexer 408. The eighth LO signal 454 applied to the eighth mixer 452 is at a frequency of 480 MHz, 530 MHz, 580 MHz, 630 MHz, 680 MHz, 730 MHz, or 780 MHz depending on the center frequency of the eighth bandpass filter 450. When the LO signal 454 is mixed with the filtered signal from the eighth bandpass filter 450, an output is produced at the eighth IF centered at 45 MHz. The ninth bandpass filter 458 has a 50 MHz bandwidth and is centered at 45 MHz. The 1:U filter demultiplexer 460 has sixteen (U=16) outputs with center frequencies ranging from 22.5 MHz to 67.5 MHz.

The example hereinabove is a specific implementation of the gateway portion of the downlink apparatus 400. Other suitable combinations of frequency ranges, bandwidths and LO frequencies would be readily recognized by one skilled in the art. All other combinations are considered to be within the scope of this invention. Additionally the example is not intended to limit in any way the scope of the downlink apparatus 400 of the present invention.

The gateway portion and the payload portion of the uplink apparatus 500, 600 are essentially the reverse equivalents of the downlink apparatuses 300, 400 except that the uplink portion of the trunkline 108 has frequencies, IF and LO signals, differing from the downlink portion of the trunkline 108. For example, the uplink for the example implementation described above could be centered at 85.8 GHz and have a frequency range extending from 81.6 GHz to 90 GHz.

The gateway portion of the uplink apparatus 500 receives U inputs from the gateway source-to-destination switch 202. The gateway portion of the uplink apparatus 500 then follows the frequency conversion and aggregation plan of the payload portion of the downlink apparatus 300 to aggregate and frequency shift the signals to the frequency band of the uplink portion of the trunkline 108. The gateway portion of the uplink apparatus 500 then sends the frequency shifted aggregated signal to the gateway antenna subsystem 114 for transmission to the atmospheric platform 101 via the trunkline 108. The uplink portion of the trunkline 108 is received by the airborne trunkline antenna subsystem 310. The signal received by the airborne trunkline antenna subsystem 310 is applied to an input of the payload portion of the uplink apparatus 600. The payload portion of the uplink apparatus 600 then follows the frequency conversion and de-aggregation plan of the gateway portion of the downlink apparatus 400 to de-aggregates and frequency shifts the signals to the frequency band of the user links 106.

It is not necessary that all data be restricted to the use of the trunkline 108. In another embodiment of the system of the present invention, data for separable data packages may also be processed and additionally routed by a second switch on board the atmospheric platform 101. Separable data is data that, by virtue of its associated destination information, can be recognized and routed to a destination within the footprint 120 by a second switch on the platform 101 without the need to be transmitted to the gateway 104.

Thus there has been described a novel network system, apparatus and method that provides wireless communications, such as voice, data, images, video, and multi-media services, to a geographic area large enough to encompass a city and its neighboring communities. The network of the present invention can provide broadband and narrowband data services to subscribers by utilizing signal bandwidths at either microwave or millimeter wave (MMW) carrier frequencies for providing wireless subscriber links. It should be understood that the above-described embodiments are merely illustrative of the some of the many specific embodiments that represent the principles of the present invention. Clearly, numerous other arrangements can be readily devised by those skilled in the art without departing from the scope of the present invention.

We claim:

1. An apparatus for aggregating and transmitting a plurality of signals and for receiving and de-aggregating the plurality of signals by way of a wireless trunkline between an atmospheric platform having an airborne antenna array subsystem and an airborne trunkline antenna subsystem and a ground based gateway having a gateway antenna subsystem and a gateway network processing subsystem, the apparatus comprising:

a downlink apparatus comprising:
a payload portion on the atmospheric platform for accepting a plurality of downlink signals from the airborne antenna array subsystem, aggregating the plurality of downlink signals to create a downlink trunkline signal, and passing the downlink trunkline signal to the airborne trunkline antenna subsystem for transmission via the wireless trunkline to the gateway; and
a gateway portion on the gateway for accepting the downlink trunkline signal received from the wireless trunkline by the gateway antenna subsystem, de-aggregating the downlink trunkline signal into the plurality of downlink signals, and passing the de-aggregated plurality of downlink signals to the gateway network processing subsystem; and an uplink apparatus comprising:
a gateway portion on the gateway for accepting a plurality of uplink signals from the gateway network processing subsystem, aggregating the plurality of uplink signals to create an uplink trunkline signal, and passing the uplink trunkline signal to the gateway antenna subsystem for transmission by way of the wireless trunkline to the atmospheric platform; and
a payload portion on the atmospheric platform for accepting the unlink trunkline signal received from the wireless trunkline by the airborne trunkline antenna subsystem, de-aggregating the uplink trunkline signal into the plurality of uplink signals, and passing the de-aggregated plurality of uplink signals to the airborne antenna array subsystem, wherein the payload portion of the downlink apparatus comprises:
a set of P first frequency conversion multiplexers, each of the first frequency conversion multiplexers having M different input ports for receiving M different downlink signals, the M different downlink signals being aggregated and frequency shifted by the first frequency conversion multiplexer thereby creating a first payload IF signal at an output port, the first payload IF signal comprising a set of M signals spread over a first payload IF frequency range;

a set of T second frequency conversion multiplexers, each of the second frequency conversion multiplexers having S different input ports for receiving S different ones of the P first payload IF signals from the first frequency multiplexers, the S different first payload IF signals being aggregated and frequency shifted by the second frequency conversion multiplexer thereby creating a second payload IF signal at an output port, the second payload IF signal comprising a set of S signals spread over a second payload IF frequency range;

a third frequency conversion multiplexer having S different input ports for receiving S different ones of the T second payload IF signals from the second frequency multiplexers, the T different second payload IF signals being aggregated and frequency shifted by the third frequency conversion multiplexer thereby creating a third payload IF signal at an output port, the third payload IF signal comprising a set of T signals spread over a third payload IF frequency range; and a frequency converter having an input port for receiving the third IF signal from the third frequency conversion multiplexer, the third payload IF signal being frequency shifted by the frequency converter thereby creating a final payload IF signal at an output port, the final payload IF signal having a final payload IF frequency range, wherein the final payload IF signal is the downlink trunkline signal, and wherein the payload portion of the downlink apparatus further comprises:
  a first payload local oscillator (LO) signal applied to an LO input port of each of the first frequency conversion multiplexer;
  a second payload local oscillator signal applied to a set of S LO ports of each of the second frequency conversion multiplexers, wherein the second local oscillator signal comprises a set of S independent signals at S different frequencies one of each of the set of S signals being applied to one of each of the LO ports;
  a third payload local oscillator signal applied to a set of T LO ports of the third frequency conversion multiplexer wherein the third local oscillator signal comprises a set of T independent signals at T different frequencies one of each of the set of T signals applied to one of each of the LO ports; and
  a fourth payload local oscillator signal applied to an LO input port of the final frequency converter.

2. An apparatus for aggregating and transmitting a plurality of signals and for receiving and de-aggregating the plurality of signals by way of a wireless trunkline between an atmospheric platform having an airborne antenna array subsystem and an airborne trunkline antenna subsystem and a ground based gateway having a gateway antenna subsystem and a gateway network processing subsystem, the apparatus comprising:

a downlink apparatus comprising:
  a payload portion on the atmospheric platform for accepting a plurality of downlink signals from the airborne antenna array subsystem, aggregating the plurality of downlink signals to create a downlink trunkline signal, and passing the downlink trunkline signal to the airborne trunkline antenna subsystem for transmission via the wireless trunkline to the gateway; and
  a gateway portion on the gateway for accepting the downlink trunkline signal received from the wireless trunkline by the gateway antenna subsystem, de-aggregating the downlink trunkline signal into the plurality of downlink signals, and passing the de-aggregated plurality of downlink signals to the gateway network processing subsystem, an uplink apparatus comprising:
  a gateway portion on the gateway for accepting a plurality of uplink signals from the gateway network processing subsystem, aggregating the plurality of uplink signals to create an uplink trunkline signal, and passing the uplink trunkline signal to the gateway antenna subsystem for transmission by way of the wireless trunkline to the atmospheric platform; and
  a payload portion on the atmospheric platform for accepting the uplink trunkline signal received from the wireless trunkline by the airborne trunkline antenna subsystem, de-aggregating the uplink trunkline signal into the plurality of uplink signals, and passing the de-aggregated plurality of uplink signals to the airborne antenna array subsystem, wherein the gateway portion of the downlink apparatus comprises:
  a first frequency conversion demultiplexer having an input port for receiving the downlink trunkline signal, the downlink trunkline signal being de-aggregated and frequency shifted by the first frequency conversion demultiplexer thereby creating a set of T different first gateway IF signals at T output ports, each of the T different first gateway IF signals having one of T different center frequencies and each having a first gateway IF bandwidth;
  a set of T second frequency conversion demultiplexers, each of the second frequency conversion demultiplexers having an input port for receiving one of the T first gateway IF signals, the first gateway IF signals being de-aggregated and frequency shifted by the second frequency conversion demultiplexer thereby creating a set of S different second gateway IF signals at S output ports of each of the T second frequency conversion demultiplexers, each of the S different second gateway IF signals having one of S different center frequencies and each having a second gateway IF bandwidth;
  a set of P third frequency conversion demultiplexers, each of the third frequency conversion demultiplexers having an input port for receiving one of the S times T second gateway IF signals, the second gateway IF signals being de-aggregated and frequency shifted by the second frequency conversion demultiplexer thereby creating a set of M different third gateway IF signals at M output ports of each of the P third frequency conversion demultiplexers, each of the M different third gateway IF signals having one of M different center frequencies and each having a third gateway IF bandwidth; and
  a set of N fourth frequency conversion demultiplexers, each of the fourth frequency conversion demultiplexers having an input port for receiving one of the M times P third gateway IF signals, the third gateway IF signals being de-aggregated and frequency shifted by the third frequency conversion demultiplexer thereby creating a set of U different fourth gateway IF signals at U output ports of each of the N fourth frequency conversion demultiplexers, each of the U different fourth gateway IF signals having one of U different center frequencies and each having a fourth gateway IF bandwidth, and wherein the gateway portion of the downlink apparatus further comprises:
a first gateway local oscillator signal (LO) applied to an LO port of the first frequency conversion demultiplexer;
a second gateway local oscillator signal applied to an LO port of each of the second frequency conversion demultiplexers;
a third gateway local oscillator signal applied to an LO port of each of the third frequency conversion demultiplexers; and
a fourth gateway local oscillator signal applied to a set of M LO ports of each of the fourth frequency conversion demultiplexers wherein the fourth gateway local oscillator signal comprises a set of M independent signals at M different frequencies, each signal of the set of M signals being applied to one of each of the LO ports.

3. The apparatus of claim 1, wherein each first frequency conversion multiplexer comprises:
a set of M amplifiers, each input port of the M different input ports of the first frequency conversion multiplexer being connected to an input of a different one of the M amplifiers;
a set of M mixers, each mixer having an RF input, an LO input, and an IF output, an output of each amplifier being connected to the RF input of a different one of the mixers, the LO port of each first frequency conversion multiplexer being connected to a different on of the mixers at the LO input;
a set of M bandpass filters, each bandpass filter having an input and an output, each mixer being connected to a different one of the M bandpass filters at the IF output; and
a multiplexer having M multiplexer inputs and a multiplexer output, the output of each of the bandpass filters being connected to a different one of the M multiplexer inputs, the multiplexer output being connected the output port of the first frequency conversion multiplexer.

4. The apparatus of claim 1, wherein the second frequency conversion multiplexer comprises:
a set of S amplifiers, each input port of the S input ports of the second frequency conversion multiplexer being connected to an input of a different one of the S amplifiers;
a set of S mixers, each mixer having an RF input, an LO input, and an IF output, an output of each amplifier being connected to the RF input of a different one of the mixers, one each of the S the LO ports of each second frequency conversion multiplexer being connected to a different on of the mixers at the LO input;
a set of S bandpass filters, each bandpass filter having an input and an output, each mixer being connected to a different one of the S bandpass filters at the IF output; and
a multiplexer having S multiplexer inputs and a multiplexer output, the output of each bandpass filter being connected to a different one of the S multiplexer inputs, the multiplexer output being connected the output port of the second frequency conversion multiplexer.

5. The apparatus of claim 1, wherein the third frequency conversion multiplexer comprises:
a set of T amplifiers, each input port of the T input ports of the third frequency conversion multiplexer being connected to an input of a different one of the T amplifiers;
a set of T mixers, each mixer having an RF input, an LO input, and an IF output, an output of each amplifier being connected to the RE input of a different one of the mixers, each of the T LO ports of the third frequency conversion multiplexer being connected to a different one of the mixers at the LO input;
a set of T bandpass filters, each bandpass filter having an input and an output, each mixer being connected to a different one of the T bandpass filters at the IF output; and
a multiplexer having T multiplexer inputs and a multiplexer output, the output of each of the bandpass filters being connected to a different one of the T multiplexer inputs, the multiplexer output being connected the output port of the third frequency conversion multiplexer.

6. The apparatus of claim 1, wherein the frequency converter comprises:
an amplifier, the input port of the frequency converter being connected to an input of the amplifier,
a mixer having an RF input, an LO input, and an IF output, an output of the amplifier being connected to the RF input of the mixer and the LO port of the frequency converter being connected to the mixer at the LO input;
a bandpass filter having an input and an output, the mixer being connected to the bandpass filter at the IF output; and
a second amplifier having an input connected to the output of the bandpass filter and an output connected to the output port of the frequency converter.

7. The apparatus of claim 1 wherein the fourth payload LO signal has a center frequency of about 60 GHz and the final payload IF signal is in the millimeter frequency range.

8. The apparatus of claim 2 wherein the first frequency conversion demultiplexer comprises:
an amplifier, the input port of the first frequency conversion demultiplexer being connected to an input of the amplifier;
a bandpass filter having an input and an output, the input of the bandpass filter being connected to an output of the amplifier;
a mixer having an RF input, an LO input, and an IF output, the output of the bandpass filter being connected to the RF input of the mixer and the LO port of the first frequency conversion demultiplexer being connected to the LO input of the mixer;
a second amplifier having an input connected to the IF output of the mixer; and
a filter demultiplexer having an input and T outputs, an output of the second amplifier being connected to the input of the filter demultiplexer and each T output of the filter demultiplexer being connected to a different one of the T output ports of the first frequency conversion demultiplexer.

9. The apparatus of claim 2 wherein each second frequency conversion demultiplexer comprises:

a bandpass filter having an input and an output, the input port of the second frequency conversion demultiplexer being connected to the input of the bandpass filter;

a mixer having an RF input, an LO input, and an IF output, the output of the bandpass filter being connected to the RF input of the mixer and the LO port of the second frequency conversion demultiplexer being connected to the LO input of the mixer;

an amplifier having an input and an output, the input of the amplifier being connected to the IF output of the mixer;

an automatic gain control amplifier having an input connected to the output of the amplifier; and a filter demultiplexer having an input and S outputs, an output of the automatic gain control amplifier being connected to the input of the filter demultiplexer and the S outputs being connected to the S output ports of the first frequency conversion demultiplexer.

10. The apparatus of claim 2 wherein the third frequency conversion demultiplexer comprises:

a bandpass filter having an input and an output, the input port of the third frequency conversion demultiplexer being connected to the input of the bandpass filter;

a mixer having an RF input, an LO input, and an IF output, the output of the bandpass filter being connected to the RF input of the mixer and the LO port of the third frequency conversion demultiplexer being connected to the LO input of the mixer;

an amplifier having an input and an output, the input of the amplifier being connected to the IF output of the mixer; and a filter demultiplexer having an input and M outputs, the output of the amplifier being connected to the input of the filter demultiplexer and the M outputs being connected to the M output ports of the first frequency conversion demultiplexer.

11. The apparatus of claim 2 wherein the fourth frequency conversion demultiplexer comprises:

a bandpass filter having an input and an output, the input port of the fourth frequency conversion demultiplexer being connected to the input of the first bandpass filter;

a mixer having an RF input, an LO input, and an IF output, the output of the first bandpass filter being connected to the RF input of the mixer and the LO port of the fourth frequency conversion demultiplexer being connected to the LO input of the mixer;

an amplifier having an input and an output, the input of the amplifier being connected to the IF output of the mixer;

a second bandpass filter having an input and an output, the input of the second bandpass filter being connected to the output of the amplifier; and a filter demultiplexer having an input and U outputs, the output of the second bandpass filter being connected to the input of the filter demultiplexer and the U output being connected to the U output ports of the fourth frequency conversion demultiplexer.

12. The apparatus of claim 2 wherein the first gateway LO signal has a frequency of about 60 GHz.

13. The apparatus of claim 1, wherein M times P equals N, N being greater than or equal to a number of outputs or beams of the airborne antenna array subsystem, and wherein P ranges from 1 to 1024, T ranges from 1 to 512, and N ranges from 1 to more than 2000.

* * * * *